(12) United States Patent
Kandekar et al.

(10) Patent No.: US 9,729,313 B2
(45) Date of Patent: Aug. 8, 2017

(54) METHODS, SYSTEMS, AND COMPUTER READABLE MEDIA FOR SCRAMBLED COMMUNICATION OF DATA TO, FROM, OR OVER A MEDIUM

(71) Applicants: Kunal Kandekar, Jersey City, NJ (US); Mihail L Sichitiu, Cary, NC (US)

(72) Inventors: Kunal Kandekar, Jersey City, NJ (US); Mihail L Sichitiu, Cary, NC (US)

(73) Assignee: Kunal Kandekar, Jersey City, NJ (US)

( * ) Notice: Subject to any disclaimer, the term of this patent is extended or adjusted under 35 U.S.C. 154(b) by 22 days.

(21) Appl. No.: 14/292,932

(22) Filed: Jun. 1, 2014

(65) Prior Publication Data
US 2014/0341378 A1 Nov. 20, 2014

Related U.S. Application Data

(62) Division of application No. 12/991,039, filed as application No. PCT/US2009/042909 on May 5, 2009, now Pat. No. 8,744,084.
(Continued)

(51) Int. Cl.
*H04B 1/7073* (2011.01)
*H04L 9/06* (2006.01)
(Continued)

(52) U.S. Cl.
CPC .......... *H04L 9/06* (2013.01); *H04L 9/12* (2013.01); *H04L 25/03866* (2013.01); *H04B 1/69* (2013.01); *H04L 2209/08* (2013.01)

(58) Field of Classification Search
CPC ... H04L 5/0053; H04L 1/0071; H04L 1/0041; H04L 25/03866; H04L 2209/08;
(Continued)

(56) References Cited

U.S. PATENT DOCUMENTS 4,575,754 A * 3/1986 Bar-Zohar ............ H04N 7/169
348/E7.057
6,741,636 B1 * 5/2004 Lender ................. H04B 1/707
375/146
(Continued)

OTHER PUBLICATIONS

Digital Electronics and Design with VHDL—Volnei A. Pedroni—Jan. 25, 2008—2 Pages.*

*Primary Examiner* — Farid Homayounmehr
*Assistant Examiner* — Christopher C Harris

(57) ABSTRACT

The subject matter described herein includes methods, systems, and computer readable medium for scrambled communication of data to, from, or over a medium. According to one aspect, the subject matter described herein includes a method for communicating data in scrambled form to or over a medium. The method includes receiving analog or digital data to be transmitted to or over a medium. The method further includes modulating samples representing at least signal using the analog or digital data to produce data modulated signal samples. The method further includes scrambling the data modulated signal samples using a predetermined scrambling algorithm. The method further includes transmitting the scrambled data modulated signal samples to or over the medium. The method further includes descrambling samples received from the medium using the inverse of the predetermined scrambling algorithm to obtain the unscrambled modulated signal samples, which can then be demodulated to retrieve original data.

20 Claims, 14 Drawing Sheets

Related U.S. Application Data

(60) Provisional application No. 61/050,541, filed on May 5, 2008.

(51) Int. Cl.
*H04L 25/03* (2006.01)
*H04L 9/12* (2006.01)
*H04B 1/69* (2011.01)

(58) Field of Classification Search
CPC .. H04L 7/00; H04L 7/10; H04J 3/0605; H04J 3/0602
USPC .................................. 375/354–376
See application file for complete search history.

(56) References Cited

U.S. PATENT DOCUMENTS

| | | | | |
|---|---|---|---|---|
| 7,050,582 | B1* | 5/2006 | Andreev | H04L 9/0668 380/268 |
| 7,203,245 | B1* | 4/2007 | Murphy | H04L 1/0047 375/219 |
| 2002/0094048 | A1* | 7/2002 | Simmons | H04L 7/042 375/362 |
| 2005/0063489 | A1* | 3/2005 | Williams | H04B 1/707 375/316 |
| 2006/0120521 | A1* | 6/2006 | Whitehead | H04L 1/0041 380/46 |
| 2007/0172000 | A1* | 7/2007 | Hamamoto | H04L 27/34 375/324 |
| 2010/0074350 | A1* | 3/2010 | Malladi | H04L 1/0041 375/260 |

\* cited by examiner

METHODS, SYSTEMS, AND COMPUTER READABLE MEDIA FOR SCRAMBLED COMMUNICATION OF DATA TO, FROM, OR OVER A MEDIUM

RELATED APPLICATIONS

This application is a divisional of U.S. patent application Ser. No. 12/991,039, filed May 5, 2009, which is the National Stage application of International Application No. PCT/US2009/042909 filed May 5, 2009, which claims the benefit of U.S. Provisional Patent Application No. 61/050,541, filed May 5, 2008, the disclosures of which are incorporated herein by reference in their entirety.

TECHNICAL FIELD

The subject matter described herein relates to scrambled communication of data to, from, or over a medium. More particularly, the subject matter described herein relates to methods, systems, and computer readable media for scrambled communication of data to, from, or over a medium where data samples of a signal are scrambled according to a scrambling algorithm.

BACKGROUND

In the field of data communication, it is often desirable to modify data being transmitted to or over a medium. For example, in code division multiple access (CDMA) communication systems, data to be transmitted and a chipping code are input into a modulator to modulate a carrier waveform using frequency modulation based on the input data and the chipping code. The resulting waveform is a frequency modulated sinusoid that is transmitted over the air interface. A demodulator demodulates the frequency modulated waveform using the chipping code and extracts the data signal.

One problem with techniques, such as CDMA, that directly modulate a carrier waveform is that the resulting signal is detectable and identifiable over the air interface as communications. Because the signal is detectable and identifiable as communications, it can be received and it is, therefore, vulnerable to a brute force attack whereby the chipping code can be discovered through brute force trial and error, and, once the chipping code is discovered, the transmitted data can be decoded.

In multiple access scenarios, it is desirable to use scrambling to reduce or avoid interference between signals of different users. To allow multiple access, signals have been conventionally multiplexed in (i) the frequency domain (FDMA—transmitting at different frequencies); (ii) time domain multiple access (TDMA—transmitting at different times); (iii) by using different codes (CDMA—using different chip codes); or (iv) using different spaces/mediums (using separate wires for each signal, or assigning a frequency for a given area, as is done in cellular systems); or (v) a combination of these. The main reason for this is that two or more signals using the same frequency transmitted at the same time in the same medium interfere with each other, and hence the information they carry is irrevocably destroyed. Code scrambling, as described herein, allows a totally new type of multiplexing scheme, which can work in conjunction with any of these (FDMA, CDMA, TDMA, or a combination thereof) or other existing schemes. This is because two or more signals using the same frequency can be scrambled with different codes, and thus even if they are transmitted at the same time in the same medium, these signals do not interfere such that the information they carry is irrevocably destroyed.

More generally, when data is stored on, transmitted to, or received from a medium, it may also be desirable to encode or scramble the data in an invertible manner for security and/or multiple access for later detection. Existing techniques based on direct carrier modulation are suboptimal for the reasons stated above with regard to CDMA communications systems.

Accordingly, there exists a need for improved methods, systems, and computer readable media for scrambled communication of data to, from, or over a medium.

SUMMARY

The subject matter described herein includes methods, systems, and computer readable medium for scrambled communication of data to, from, or over a medium. According to one aspect, the subject matter described herein includes a method for communicating analog or digital data in a scrambled form to or over a medium. The method includes receiving analog or digital data to be transmitted to or over a medium. The method further includes modulating samples representing at least one signal using the data to produce data modulated signal samples. The modulation may be effected using a traditional modulation technique, either carrier-less or using one or more carrier signals using the data, to produce modulated signal samples. Carrier-less modulation refers to modulation of samples that represent a waveform other than a carrier. A carrier waveform is typically a sinusoid. In carrier-less modulation, a non-sinusoidal waveform, such as a square wave that represents different data values can be modulated using the data to be transmitted. For example, in carrier-less modulation, a portion of the waveform that represents a one can be changes to a portion that represents a zero or vice-versa based on the transmitted data. The method further includes scrambling the modulated signal samples using a predetermined scrambling algorithm. The method further includes transmitting the scrambled modulated signal samples to or over the medium. The method further includes descrambling samples received from the medium using the inverse of the predetermined scrambling algorithm to obtain the unscrambled modulated signal samples, which can then be demodulated to retrieve the original data.

The terms, "signal," "electrical signal," and "optical signal" as used herein, are intended to refer to electrical, magnetic, and/or optical waveforms that are transmitted over wired or wireless media. For example, an electrical signal may include an electromagnetic signal sent over the air between a wireless transmitter and a wireless receiver or a signal that is transmitted over a conductor. Similarly, an optical signal may be a light pulse that is transmitted over the air or over a fiber.

According to another aspect, the subject matter described herein includes a method for obtaining and descrambling scrambled data from a medium. The method includes receiving scrambled modulated signal samples being scrambled samples of digital samples of modulated data using transmitted data. The method further includes descrambling the scrambled modulated signal samples using a predetermined descrambling algorithm being the inverse of a scrambling algorithm used to generate the scrambled modulated signal samples to produce descrambled modulated signal samples. The method further includes demodulating the descrambled modulated signal samples to produce the transmitted data.

According to yet another aspect, the subject matter described herein includes a method of synchronizing a receiver to a transmitter to sub-sample accuracy. The method includes at a transmitter: transmitting a scrambled signal, referred here as a known signal, which, when descrambled, comprises distinctive attributes for allowing an intended receiver to synchronize to the transmitter; and after transmitting the scrambled known signal, transmitting scrambled data. The scrambled data is generated by modulating digital signal samples representing at least one carrier signal using data to be transmitted and producing data modulated signal samples and scrambling the modulated signal samples using a predetermined scrambling algorithm. The method further includes, at a receiver, synchronizing to the transmitter with sub-sample accuracy using the scrambled known signal and, after synchronizing, descrambling the data.

According to yet another aspect, the subject matter describe herein includes a method of synchronizing the receiver to a transmitter to sub-sample accuracy. The method includes, at a transmitter: transmitting scrambled data; and transmitting a separate, non-scrambled synchronization signal to be used by a receiver to synchronize with the transmitter. The scrambled data is generated by modulating signal samples using data to be transmitted and producing data modulated signal samples and scrambling the modulated data samples using a predetermined scrambling algorithm. The method further includes, at the receiver: receiving the scrambled data; and receiving the separate, non-scrambled synchronization signal and synchronizing to the transmitter using the separate, non-scrambled synchronization signal.

According to yet another aspect, the subject matter described herein includes a system for communicating data to or over a medium. The system includes a modulator for receiving data to be transmitted to or over a medium and for modulating signal samples, using the data, to produce data modulated signal samples. The system further includes a scrambler for scrambling the modulated signal samples using a predetermined scrambling algorithm to produce scrambled data modulated signal samples. The system further includes a transmitting transducer for transmitting the scrambled data modulated signal samples to or over the medium.

According to yet another aspect, the subject matter described herein includes a system for receiving scrambled data from a medium. The system includes a receiving transducer for receiving, from a medium, scrambled data modulated signal samples, the scrambled data modulated signal samples including analog or digital samples representing at least one data modulated signal and wherein the samples are scrambled using a scrambling algorithm. The system further includes a descrambler for receiving, from the receiving transducer, scrambled data modulated signal samples and for descrambling the scrambled data modulated signal samples using a descrambling algorithm that is the inverse of the scrambling algorithm to produce descrambled data modulated signal samples. The system further includes a demodulator for receiving the descrambled data modulated signal samples and for demodulating the descrambled data modulated signal samples using modulation that is the inverse of modulation used to generate the data modulated signal samples to produce data that was originally transmitted over or stored by the medium.

The subject matter described herein for scrambled communication of data to, from, or over a medium may be implemented using a computer readable medium having stored thereon computer executable instructions that when executed by a processor of a computer perform steps. Exemplary computer readable media suitable for use with the subject matter described herein include chip memory devices, disk memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
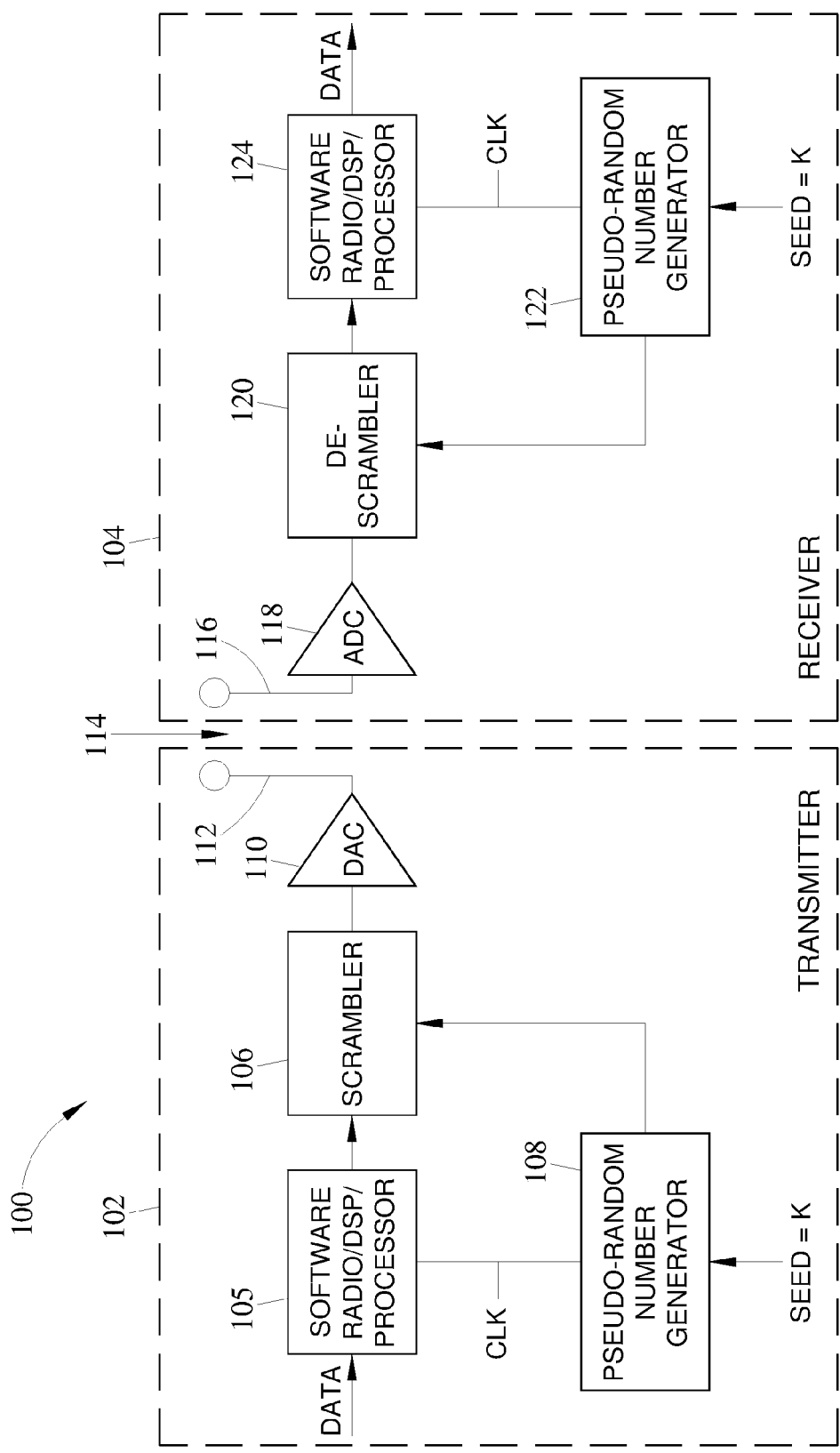
FIG. 1 is a block diagram of a system for scrambled communication of data to, from, or over a medium according to an embodiment of the subject matter described herein.

The subject matter described herein includes methods, systems, and computer readable medium for scrambling data for transmission to, from, or over an interface. FIG. 1 is a block diagram illustrating an exemplary system for scrambled communication of data to, from, or over a medium according to an embodiment of the subject matter described herein. Referring to FIG. 1, exemplary system 100 includes a transmitter 102 and a receiver 104. However, it should be noted that the subject matter described herein is not limited to a system that includes both a transmitter and a receiver. A system with a transmitter only or a receiver only is intended to be within the scope of the subject matter described herein.

In FIG. 1, transmitter 102 includes a modulator 105, a scrambler 106, a number generator 108 that generates a pseudo random or deterministic sequence of numbers, a digital to analog converter (DAC) 110 and a transmitting transducer 112. The terms "pseudo random number sequence" and "sequence of pseudo random numbers" are used interchangeable herein to refer to a sequence of numbers where each number is generated using a pseudo random number generator or where the ordering of a sequence of numbers is selected using numbers output from a pseudo random number generator. A deterministic sequence of samples may be a code that is agreed upon in advance between a transmitter and receiver pair. In such a case, number generator 108 may read the pre-agreed code from memory or generate the code using the same deterministic method used by the number generator for the descrambler at the receiver. Modulator 105 may be any type of modulator that can modulate the data for example by modulating a carrier signal or plural carrier signals, but also by using carrier-less modulation using the digital or analog data to be transmitted. The modulation as used may be amplitude modulation, frequency modulation, phase modulation, any combination thereof, or other forms of modulation (e.g., CDMA) including multi-carrier modulations (e.g., OFDM) and carrier-less modulations. For example, quadrature amplitude modulation (QAM), CDMA, or other modulation techniques may be used with settings appropriate for intended communications medium 114.

In one embodiment of the subject matter described herein, modulator 105 may be implemented using a software defined radio (SDR). A software defined radio is a radio that implements in software, using digital signal processing techniques, communication blocks that were traditionally operating on implemented in hardware (e.g., modulator/demodulator, equalizer, filters, etc.). The main advantage of an SDR is its flexibility—by changing the software, the blocks of the communication system can be easily changed and/or upgraded. The output of modulator 105 may be a carrier modulated set of samples where the samples are modulated based on the input data. In traditional communications systems, such as CDMA communications systems, it is this data that would be output to a digital to analog converter and transmitted over the air interface (usually, after an up-conversion in a suitable frequency band). However, according to an aspect of the subject matter described herein, this data is scrambled using scrambler 106 and number generator 108.

Scrambler 106 may scramble or alter the data modulated signal samples output from modulator 105 to produce scrambled samples. For example, scrambler 106 may reorder the data modulated signal samples. Reordering the data modulated signal samples may include reordering the samples according to an order specified by a code. In one embodiment, the code can be a pseudo random sequence of numbers generated by number generator 108. In an alternate embodiment the code determining the scrambling order can be specified by other means. In another example, scrambler 106 may perform a mathematical operation, such as arithmetic or logic operation using the data modulated signal samples and a pseudo random number sequence generated by number generator 108 to produce the scrambled data modulated signal samples. The scrambling performed by scrambler 106 may be performed on groups of samples at a time, across data modulated signal samples for the same carrier or across data modulated signal samples from different carriers. Detailed examples of scrambling data modulated signal samples will be provided below.

The scrambling performed by scrambler 106 may be for a single user for secure transmission over communication medium 114. In an alternate example, the scrambling performed by scrambler 106 may be for multiple users for simultaneous multiple access to communication medium 114. In one multiple access scenario, scrambler 106 may use the same scrambling algorithm for different users but with different codes (in one embodiment sequences of pseudo random numbers) for each user. In an alternate implementation, scrambler 106 may use different scrambling algorithms for each user in a multiple access scenario and may use the same or a different key or sequence of pseudo random numbers as input to each algorithm. The scrambled data modulated signal samples for the different users may be simultaneously transmitted by transmitting them with transducer 112 over medium 114, thus producing multiple access communications.

In one implementation, number generator 108 may be a module that is given a seed key K that would generate a sequence of pseudo random numbers. If multiplexing or multiple access is the only desired property of the system, any desired random number generator will work. If encryption is also a goal, a stream cipher (e.g., RC4, A5/1, A5/2, FISH, SEAL, Pike, etc.) can be used. Number generator 108 may generate one pseudo random number for each sample generated by modulator 105 on the clock signal CLK illustrated in FIG. 1. Thus, for a sequence of samples of length B, modulator 105 and scrambler 106 may generate a sequence of pseudo random numbers, also of length B. In an alternate implementation, the pseudo-random number generator can be replaced by any other mechanism that produces a suitable scrambling code. One desirable characteristic of the scrambling code is its uniqueness for a transmitter-receiver pair. For example, a deterministic scrambling order can be defined as long as the order is different for each transmitter-receiver pair.

For each string of samples output from modulator 105, scrambler 106 may combine a string of pseudo random numbers from number generator 108 to generate a string of scrambled samples. Scrambler 106 may use any method of scrambling, which preferably has the following properties:

- The operation is reversible, i.e., given the scrambled sequence and pseudo random number sequence, the original sample sequence can be recovered.
- Especially for the encryption property, the original sample cannot be recovered from the scrambled sample without the sequence of pseudo random numbers.
- The output of the scrambler should resemble white noise (wide spectrum).

As described above, in one embodiment, scrambler 106 may change the sequence of the modulated samples according to the orders specified by the pseudo random number sequence. Details of this embodiment will be described below.

As described above, in systems with multiple carriers encoding multiple parallel strings of data (e.g., in orthogonal frequency division multiplexing (OFDM) and multiple in-multiple out (MIMO) systems), scrambling may occur across the data modulated signal samples for each carrier. In addition, as also described above, scrambler 106 may also work on groups of samples, rather than individual samples. That is, instead of scrambling each individual sample, scrambler 106 may scramble plural samples at a time.

In an alternate embodiment, rather than reordering the samples, scrambler 106 may use addition (one sample with one pseudo random number) modulo the signal range. Digital to analog converter 110 may convert the scramble data modulated signal samples output from scrambler 106 to produce an analog signal to be transmitted by transmitting transducer 112 and communications medium 114 to receiver 104. Communications medium 114 may be a wired medium, a wireless medium, or a storage medium, depending on the desired application. If communications medium 114 is a storage medium, digital to analog converter 110 and transmitting transducer 112 may be omitted. Instead, these components would be replaced with a driver for driving a write line or bus coupled to the storage medium.

In the illustrated example, transmitting transducer 112 represents any device that provides a transmission of analog signal to communications medium 114. In a wireless system, transmitting transducer 112 may include an up converter (optional, to the desired band), output amplifier, and an antenna. In a wired system, transmitting transducer 112 may be a transducer for transmitting signals over a wired electrical or optical medium.

In an alternate embodiment, rather than converting the samples output from scrambler 106 to analog format and using analog modulation to up convert the signal to a desired frequency, the scrambled samples output from scrambler 106 may be digitized through quantization, and the resulting digital values may be transmitted over the transmission medium using any suitable transmission method. For example, the digital values may be used to amplitude, phase and/or frequency modulate a carrier signal that is transmitted electrically or optically over the transmission medium. In such a system, transmitting transducer 112 may include a quantizer for quantizing the samples to produce data values, a digital modulator for modulating a carrier waveform using the data values, and either an electrical or optical transmitter for transmitting the digitally modulated carrier over the transmission medium.

Referring to receiver 104, a receiving transducer 116 may receive the analog or digital signal transmitted by transmitting transducer 112. In a wireless system that uses analog up conversion, receiving transducer 116 may include an antenna and a down converter. In a wired system, receiving transducer 116 may include a transducer for receiving signals from a wired electrical or optical medium. In a storage medium, receiving transducer 116 may include a driver for reading data from a read line or bus coupled to a storage medium. In a system where the scrambled signals output from scrambler 106 are converted to digital data values through quantization and used to digitally modulate a carrier signal, receiving transducer 116 may include a digital demodulator to extract the transmitted data values and to generate, from the digital data values, scrambled data modulated signal samples representative of the samples output from scrambler 106.

In a system where analog transmission is used, an analog to digital converter (ADC) 118 converts the analog signal received by transducer 116 to a digital signal or digital representation of the received signal. In embodiments where a digital signal is transmitted, analog-to-digital converter 118 may be omitted. A descrambler 120 receives the digital signal from analog to digital converter 118 or from receiving transducer 116, applies the inverse of the scrambling algorithm implemented by scrambler 106, and produces descrambled data modulated signal samples. A number generator 122 may generate a pseudo random or deterministic sequence of numbers that is the same as that produced by number generator 108. In order to ensure that the sequences are the same, number generator 122 and number generator 108 may start with the same seed. In order to synchronize the descrambling of signals, the data transmitted by transmitter 102 may include a synchronization preamble that instructs receiver 104 when to start descrambling a received signal. Alternative synchronization methods (such as using a sub-carrier) can be used.

A demodulator 124 receives the descrambled data modulated signal samples from descrambler 120 and demodulates the descrambled data modulated signal samples to produce the data that was input to transmitter 102.

In operation, receiving transducer 116 may receive, from medium 114, scrambled data modulated signal samples. The scrambled data modulated signal samples may include digital samples representing at least one data modulated carrier. For example, transducer 116 may receive an analog waveform that was generated by DAC 110 based on digital scrambled data modulated signal samples generated by scrambler 106. Descrambler 120 may receive the scrambled modulated data samples and descramble the scrambled data modulated signal samples using a descrambling algorithm that is the inverse of the scrambling algorithm to produce descrambled data modulated signal samples. For example, if scrambler 106 uses a scrambling algorithm that re-orders the samples using a pseudo random number sequence, descrambler 120 may use a descrambling algorithm and the same pseudo random number sequence to put the samples in the correct order.

Demodulator 124 may receive the descrambled data modulated signal samples and demodulate the descrambled data modulated signal samples using modulation that is the inverse of modulation used to generate the data modulated signal samples to produce the data that was originally input to transmitter 102. For example, if the modulation technique is FM, FM demodulation may be used to determine data bits corresponding to frequency changes in the FM-modulated carrier samples.

As with transmitter 102, some or all of the components of receiver 104 may be implemented using an SDR. In one exemplary implementation, at least one of demodulator 124 and descrambler 120 may be components of an SDR. Whether to implement a component of transmitter 102 or receiver 104 in hardware, firmware, or software may depend on the computational intensity of the operation performed by the component and the computational resources of the component. For example, components that perform computationally intensive functions, such as some types of synchronization, may be implemented in hardware or firmware. Components that perform non-computationally-intensive operations, such as some types of carrier modulation, may be implemented in software as part of an SDR.

Receiver 104 may be configured to descramble multiple access communications or scrambled communications from at least a single transmitter to medium 114. In descrambling multiple access communications, descrambler 120 may descramble modulated data samples using at least one of different descrambling algorithms and different descrambling pseudo-random sequences. For example, if the transmitters use the same scrambling algorithm but different pseudo random number sequences, descrambler 120 may receive a sequence of scrambled data modulated signal samples and apply the descrambling algorithm multiple times to the sequence using the same scrambling algorithm and different pseudo random number sequences for each transmitter to extract the data that was simultaneously transmitted over medium 114 by the different transmitters. In detecting scrambled samples for a single transmitter, descrambler 120 may use a descrambling algorithm that is the inverse of the scrambling algorithm used by the transmitter and a pseudo random number sequence that is the same as that used by the transmitter.

Receiver 104 may be configured to descramble scrambled data that was generated by modulating a single carrier or by modulating multiple carriers. For example, descrambler 124 may receive a sequence of scrambled data that was generated by modulating multiple carriers based on the data values and then scrambling the resulting set of samples. Descrambler 124 may apply a descrambling algorithm that groups together samples were generated by the same carrier. Demodulator 124 may receive the groups of unscrambled samples for each carrier, perform demodulation using the carrier used to generate each group of samples, and output data generated by modulating each carrier in the order in which the data was originally input to transmitter 102. In the carrier-less or single carrier case, descrambler 120 may apply the descrambling algorithm to produce modulated signal samples for the single carrier. Demodulator 124 may demodulate the samples using the single carrier (or no carrier for carrier-less modulation) as input to produce the data that was originally input to transmitter 102.

Receiver 104 may apply the descrambling to individual scrambled data modulated signal samples or to groups of scrambled data modulated signal samples, depending on how the samples were scrambled. For example, if scrambler 106 applies a scrambling algorithm where a pseudo random number is added to each data modulated carrier sample, then descrambler 120 may apply a descrambling algorithm that subtracts the pseudo random number that was added to each data modulated carrier sample from each data modulated carrier sample. If scrambler 106 applies a scrambling algorithm where the same pseudo random number is added to a group of samples but different pseudo random numbers are added to different groups of samples, descrambler 120 may apply a descrambling algorithm that subtracts the same pseudo random number that was added to each group of samples from each group of samples.

As in the preceding paragraph, in one implementation, descrambler 120 performs a mathematical operation to descramble the scrambled data modulated signal samples. Any suitable mathematical operation may be used. For example, the mathematical operation may be an arithmetic operation, such as addition, subtraction, multiplication, division, or any combination thereof. In an alternate implementation, the mathematical operation may be a logic operation, such as an AND, OR, NAND, NOR, exclusive OR, or any combination thereof. In yet another implementation where scrambler 106 scrambles samples by changing their ordering in time, descrambler 120 may perform a re-ordering operation. The re-ordering performed by descrambler 120 may be based on the same pseudo random number sequence used to change the ordering of the samples at transmitter 102.

As stated above, the scrambling performed by scrambler 106 may be used for encryption and/or multiple access. The following section illustrates an exemplary reordering method for scrambling the data modulated signal samples that may be implement by scrambler 106 and descrambler 120. The method described below will be referred to as code scrambled communications.

Code Scrambled Communications

Overview

In this section, the concept of Scrambled Communications/Scrambled is introduced.

Background

There are four ways to multiplex (i.e., to combine several "simultaneous" signals on the same "channel" (see "multiplexing" at Wikipedia)):

Space multiplexing that works by having transmissions take place on different parts of the media (e.g., on two different wires or optical cables, or in two different parts of a country for a wireless communication);

Frequency multiplexing that separates the signals in frequency (similar to radio and TV broadcast that uses different frequencies for different channels;

Time multiplexing that uses different time slices for different users; and

Code multiplexing that allows several users to share the same media by using different codes for different users.

CDMA (Code division multiple access) is a well-known code multiplexing technique that has been included in several cellular phone standards. Pulse Position Modulation (PPM) for ultra-wide band signals is another form of code multiplexing. In this patent we introduce a new form of code multiplexing, which we term "code scrambled communications".

The introduced form of multiplexing has several inherent properties that can be very desirable for a large spectrum of applications:

It is robust to noise;

It is very wide spectrum and thus resistant to fading;

It allows for encryption at an extremely low level in the networking stack, making brute force attacks far more difficult to mount than with traditional encryption schemes; and It has a very low probability of detection.

Introduction

We have identified a very interesting property of digital signals: when the sequence of samples is scrambled with a pseudorandom sequence, it appears as white spectrum noise; practically, all signals produced by a transceiver are necessarily band-limited, thus not being a true white noise, however, we will refer to the wide-band representation of the scrambled signal as white noise. The same white spectrum noise when descrambled using the same pseudorandom sequence results recovers the original signal. However, more interestingly, at the receiver, if signals other than the scrambled signal are incident at the same time, the process of descrambling to recover the scrambled signal ends up scrambling the other signals to look like noise. Any ambient noise that is also incident at the receiver also gets scrambled, but it still looks like noise.

Hence, if two signals S1 and S2 at the same frequency are scrambled with two different pseudorandom sequences R1 and R2 respectively and added up, descrambling the sum with either one of the pseudorandom sequences will recover only the respective original signal, while the other scrambled signal remains white noise. Since the other signal appears as noise, it can be filtered out using standard signal processing techniques.

This means that scrambling sequences of signal samples with pseudorandom sequences offers yet another means of code multiplexing.

Scrambling

Scrambling is defined as a function, which operates on a sequence of samples representing a signal resulting in another sequence of samples (of the same length) that represents a different signal, or preferably, noise.

The scrambling function should have the following properties when applied to signals, keeping in mind that most signals in conventional communications are sinusoidal waves:

1. Reversible: so that the scrambled signal can be recovered at the receiver. We call the reverse scrambling function, unimaginatively enough, "descrambling".
2. Impossible to descramble without the correct code (any other code will make the descrambled signal appear as noise).
3. Output should resemble white spectrum noise in both the time domain, and the frequency domain.

If the scrambling and descrambling functions are not reversible this scheme will not work, as the scrambled signal will not be recoverable at the receiver.

Benefits

CSC has the following benefits:

1. Multiplexing: a whole new multiplexing scheme, which can easily be used with any combination of conventional multiplexing schemes like TDMA, FDMA and CDMA.
2. Encryption at the PHY layer.
3. Very low probability of detection through a truly white spectrum.
4. Resilience to multi-path propagation effects: all multi-path components of the transmission that arrive after transmitter/receiver synchronization get de-scrambled out of synchronization, and hence appear as noise. Hence there is little probability inter-symbol interference.
5. Simplified post-processing of descrambled signals: since all other ambient signals and noise gets descrambled into pseudorandom noise, a simple moving average filter can easily filter it out to extract the descrambled sinusoidal carrier signal.

Qualifications

CSC is subject to the following qualifications:

1. Requires very good synchronization between the transmitter and the receiver, down to a single sample interval.
2. All ambient signals and noise other than the intended signal get descrambled into flat noise, and hence the receiver sees a lower overall SNR than what it would if it could identify and filter out the other signals. Furthermore, any lack of synchronization also raises the "ambient" noise in the descrambled signal, leading to lower SNR and hence lower transfer rates. However, a simple moving average filter or exponential moving average filter may help remove a large portion of the pseudorandom ambient noise.
3. Transmissions appear like white noise to all other conventional signals in that band, and hence may affect the effectiveness of other receivers that rely on conventional techniques for medium access.

Exemplary Implementation

The following sections detail an exemplary implementation that we used in our SDR model.

Scrambling: The scrambling and descrambling operations are conceptually explained in the diagrams below.

Figure 2:
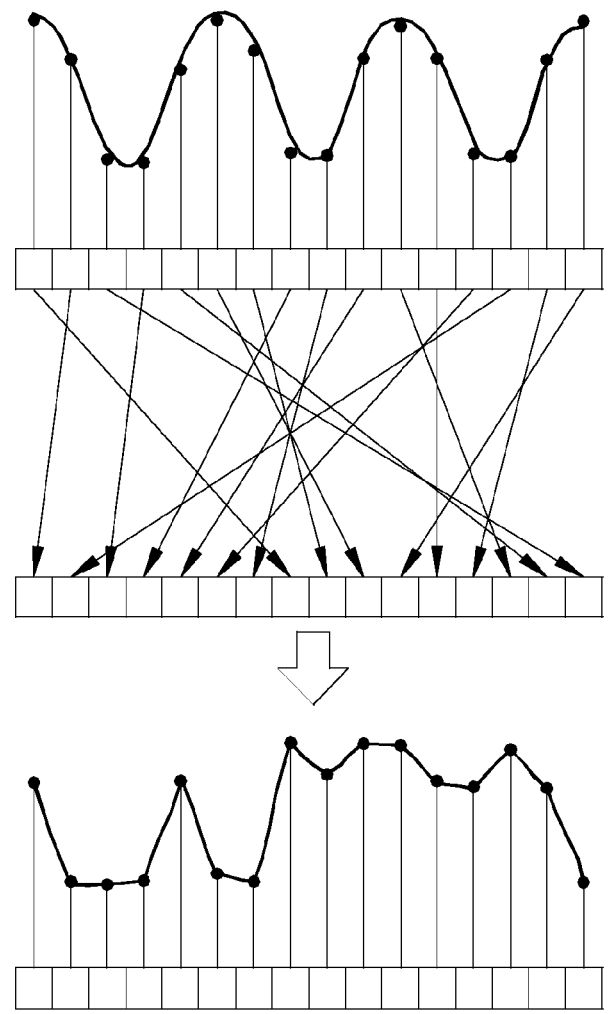
FIG. 2 is a diagram illustrating exemplary scrambling of data samples representing a modulated carrier according to an embodiment of the subject matter described herein.

FIG. 2 depicts the scrambling operation, showing:
1. the signal of the incoming samples, here a clearly identifiable sinusoidal wave,
2. the pseudorandom scrambling sequence,
3. the sequence scrambling operation, and
4. the signal of the resultant sample sequence, which looks like noise itself.

Figure 3:
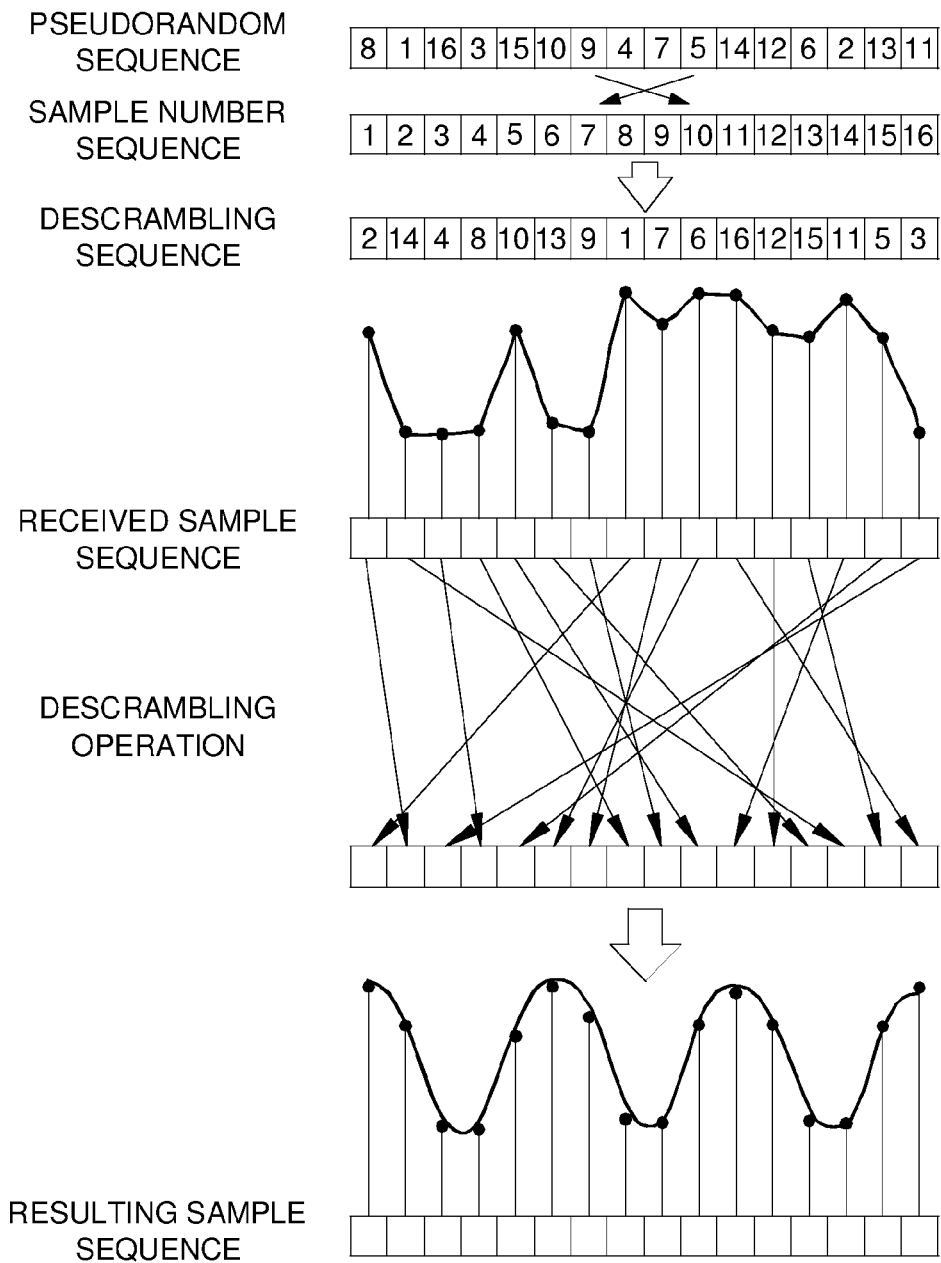
FIG. 3 is a diagram illustrating exemplary descrambling of samples representing a data modulated carrier according to an embodiment of the subject matter described herein.

FIG. 3 depicts the descrambling operation, showing:
1. the signal of the incoming samples, which looks like random noise,
2. the pseudorandom sequence, which is used to generate the descrambling sequence, (which reverses the scrambling operation),
3. the sequence descrambling operation, and
4. the signal of the resultant sample sequence, which looks like the original sinusoid.

Note that FIGS. 2 and 3 only provide a conceptual overview of the invention, and do not limit the exact manner of the scrambling and descrambling operations to the depicted enablements, and any implementation that achieves the same effect is covered by the terms "scrambling" and "descrambling". For instance, the code we used for our proof of concept (provided in Listing 1 below) is optimized for software implementation, and is different from the example provided by FIGS. 2 and 3, but is conceptually the same, that is they both scramble the sequences of sample strings resulting in a reordered sequence that looks like noise. As such FIGS. 2 and 3 and the listing depict two different enablements for the scrambling and descrambling operation.

In other embodiments, the values of the sample sequences may be modified as well, for example mathematical addition or subtraction of the pseudorandom sequence to the sample sequence. However these embodiments are less preferred as their multiplexing properties are limited.

In one exemplary embodiment for an SDR, we use the following scrambling and descrambling functions, which has complexity O(n), where n=number of samples:

Listing 1: scrambling and descrambling code

```
void scramble(float [ ] sample_sequence, int [ ] pn_sequence, int num_samples)
{
  float tmp = 0;
  int swapWith = 0;
  for (int i = 0; i < num_samples; i++) {
    //swap
    swapWith = pn_sequence[i];
    tmp = sample_sequence[i];
    sample_sequence[i] = sample_sequence[swapWith];
    sample_sequence[swapWith] = tmp;
  }
}
void descramble(float [ ] sample_sequence, int [ ] pn_sequence, int
```

Listing 1: scrambling and descrambling code

```
  num_samples)
  {
    float tmp = 0;
    int swapWith = 0;
    for (int i = num_samples - 1; i >=0; i--) {
      //swap
      swapWith = pn_sequence[i];
      tmp = sample_sequence[swapWith];
      sample_sequence[swapWith] = sample_sequence[i];
      sample_sequence[i] = tmp;
    }
  }
```

Observe that the first method scrambles the sequence of the incoming samples (sample_sequence) using pseudorandom numbers (pn_sequence) without actually losing or changing the values of any of the incoming samples. That means, each value in the original sequence occurs exactly once in the resultant scrambled sequence (which, in this embodiment, is stored in the same array or memory location.) Thus no information is really lost or modified, only obfuscated. This also means that given the scrambled sample sequence, the original signal can be completely recovered using the second method. Also, this is done in a single loop over the sequence, giving O(n) complexity where each operation is a simple swap function. This makes these methods extremely simple to implement and very efficient to compute even in software, while being possible to make it even more efficient in hardware (as explained below).

In other embodiments, during scrambling, the values of the samples may be changed instead of, or in combination with, the scrambling of their sequence, for instance by mathematical operations, such as addition or subtraction, with the same or another pseudorandom sequence. On the receiver, the same set of operations (mathematical operations and/or sequence scrambling) is applied in reverse order to retrieve the original signal Note that this is only one possible implementation in one possible language (in this case, C++ or Java) in one possible medium (software.) The invention is not limited to this particular embodiment, and would typically be implemented differently for different enablements.

The scrambling function at the transmitter takes a string of sample values (sample_sequence), a string of pseudorandom numbers (pn_sequence) and the number of samples (num_samples), and then scrambles the sequence, that is, the order, of the sample values using the pseudorandom numbers, which is then transmitted. In this embodiment, it is important that the value of any pseudorandom number not exceed (num_samples—1) to avoid memory location errors.

At the receiver, the descrambling function takes a string of received sample values (sample_sequence), a string of pseudorandom numbers (pn_sequence) and the number of samples (num_samples), and then descrambles the sequence, that is, the order, of the sample values using the pseudorandom numbers. It is necessary that the pseudorandom sequence pn_sequence be identical at both, transmitter and receiver. It would also be beneficial if the sample sequence sample_sequence is identical at both, transmitter and receiver, but this is typically not practically possible, since ambient signals and noise will greatly vary the values of the transmitted samples. It is however, possible, and even easy, to ensure that the pseudorandom sequence is identical at both ends by feeding a common seed to the pseudorandom number generator.

It is also necessary that the pseudorandom sequence pn_sequence at the receiver is applied to the same received samples that contain the sample_sequence that was scrambled using the same pseudorandom sequence pn_sequence. This means that the transmitter and receiver should be highly synchronized.

If implemented in hardware (FPGA or ASIC components), the scrambler would typically consist of two FIFO buffers. One buffer would receive the signal samples, and the second buffer would receive the generated pseudorandom numbers, and in as little as a single clock cycle, the sequence of values in the first buffer would be scrambled by the sequence in the second buffer. In another embodiment, there may be a third buffer into which the resulting scrambled sequence would be placed. Similarly, the descrambler would consist of two FIFO buffers. One buffer would receive the scrambled samples received from the medium, and the second buffer the generated pseudorandom numbers, and in as little as a single clock cycle, the sequence of values in the first buffer would be descrambled by the sequence in the second buffer. In another embodiment, there may be a third buffer into which the resulting descrambled sequence of samples would be placed.

Key Exchange:

This process assumes that both, the transmitter and receiver have the same key that is used to generate pseudorandom sequences, and this could be done in several ways, including pre-configuration, or using public/private key exchange schemes.

Pseudorandom Sequence Generation:

In one embodiment this scrambling sequence is generated at both ends using the above key as the seed. A pre-generated block of the same pseudorandom numbers may be used for successive blocks, or new pseudorandom numbers would be continuously generated for each successive block. In other embodiments, this scrambling sequence can be deterministic as long as it is different for different transmitter and receiver pairs that have to be capable of successfully transmitting on the same channel.

Synchronization:

The level of synchronization required for this scheme can be achieved using advances in conventional synchronization techniques. Basically before each data transmission, the transmitter transmits a preamble, a short sequence of unscrambled signal samples, which the receiver uses to detect the beginning of a transmission. This preamble could be manipulated to help achieve better synchronization, for instance modulated signals or bits, which conventional techniques use (correlation, PLLs, and such.)

In a simple embodiment, a clear signal is transmitted as preamble to signal an imminent transmission. Following this preamble, the transmitter generates a short signal of a specific length and with specific modulation that is known to the receiver, either through pre-configuration or through collaborative, just-in-time decision-making.

This short signal is called the known signal, and it is then scrambled with the pseudorandom sequence generated with the key, and transmitted. Hence the known signal would also resemble noise.

Following transmission of the scrambled known signal, the modulated signal is scrambled with the pseudorandom sequence and transmitted.

On detecting this preamble, the receiver activates and goes into "seek" mode, where it waits for the clear signal to fade. A fading of the preamble signal indicates that the known signal samples are being received now, which resemble noise since they have been scrambled.

The receiver then goes into "sync" mode, where it tries to find the exact sample at which it is in synchronization with the transmitted samples. It does this by:
1. generating the same pseudorandom sequence used at the transmitter (using the shared key),
2. setting an offset of 0 in the received samples,
3. descrambling a block of the received samples that starts at that offset and extends to that offset+the length of the known signal (which it knows beforehand either through pre-configuration or through collaborative, just-in-time decision-making, as described in the transmitter operation),
4. checking for the presence of the known signal in the descrambled sequence, by either:
   a. performing Fourier analysis (FFT)
   b. cross-correlation, or
   c. other DSP methods,
5. increasing the offset by one sample and looping back to step 3 if the known signal is not detected, and
6. breaking from "sync" mode if known signal is detected, or its presence exceeds a certain threshold (which could be determined through heuristics, configuration or adaptive mechanisms).

In an alternate embodiment, the receiver generates the shared known signal in advance, and scrambles it with the pseudorandom sequence beforehand, and then checks for the presence of this scrambled known signal in the received samples. It can do this by:
1. generating the same pseudorandom sequence used at the transmitter (using the shared key),
2. generating a pre-decided known signal that the transmitter would also generate,
3. scrambling the known signal with the pseudorandom sequence,
4. checking for the presence of the scrambled known signal in the received samples (before descrambling), using cross-correlation or other methods,
5. finding the offset where the scrambled known signal most highly correlates with the received samples, i.e. the correlation exceeds a certain threshold (which could be determined through heuristics, configuration or adaptive mechanisms),
6. accepting the next block of received samples and looping back to step 4 if adequate correlation is not found, and
7. advancing to the offset of maximum correlation (if found) and breaking from "sync" mode.

The receiver then goes into "lock" mode, where exact synchronization has been achieved, and the beginning of the scrambled information-bearing samples is detected. In "lock" mode, the received samples are simply descrambled using the pseudorandom number sequence in successive blocks and passed on to further components for further processing, such as demodulation and data extraction.

In other embodiments, the unscrambled preamble can be completely missing, with the receiver continuously searching for the scrambled known signal and starting the data reception upon finding the scrambled known signal.

In other embodiments the known signal can be placed at different places within the frame, for example, in the middle of the frame, or at the end of the frame.

In other embodiments, an unscrambled sub-carrier signal can be transmitted along with the scrambled noise to help achieve and maintain synchronization.

CSC Proof of Concept

In one experiment used to prove that the subject matter described herein could successfully communicate scrambled data over a medium and descramble the received data, two transmitters and two receivers communicating simultaneously over the same, shared medium over CSC are demonstrated here. The shared medium is an audio cable connecting an output port of a soundcard to the input port of a soundcard. The experimental data shown below was collected where the same soundcard was used for the transmitter and the receiver. In later experiments, a soundcard in one computer was used as the transducer for the transmitter, and the soundcard in another computer was used as the receiver. In the experiments used to generate the data below, each transmitter comprises GnuRadio software sending samples to the first soundcard DAC and each receiver comprises GnuRadio software receiving samples from the second soundcard ADC.

In our experiments we used a sound card as a transducer. In particular, the speaker function of the card was used at the transmitter, while the microphone function was used at the receiver. Before the speaker the signal to be sent is identical to the one that would be sent to an up-converter and to an antenna in a wireless system, while after the microphone, the received signal is equivalent with the signal received from the antenna and down-converted.

It is common for software defined radio experiments to be done either entirely in software (completely bypassing the transducer) or using a sound card.

The main advantage of using the sound card was convenience, as it was already available on the laptop we used for experiments. The main disadvantage of the sound card is its limited available bandwidth and the noise and distortion introduced by the speaker and the microphone.

However, the experimental setup worked well even in these adverse conditions, this speaking very favorably about the robustness of the scheme. Essentially, using a sound card was a worst-case scenario—almost any wired or wireless communication system has far better bandwidth, less noise and less distortion. In a well engineered wireless, or wired system with less distortion and noise, and larger bandwidth we expect far better results.

In the present experiment, one transmitter/receiver pair, TX1 and RX1, uses a different key for scrambling and descrambling their signals than the other pair, TX2 and RX2. Both receivers RX1 and RX2 are connected to the same, shared medium, and hence have the same input samples.

Each of the following screenshots illustrated in FIGS. 4-9B consist of a UI with one or more of the following three spectrum analyzer (FFT) displays:
1. RX: The topmost FFT display in FIGS. 7-9B depicts the spectrum of the signal received by the DAC, that is, whatever is received from the shared medium.
2. CSC RX1 O/P: the middle FFT display in FIGS. 7-9B depicts the spectrum of the signal as output by the first CSC receiver (RX1) after descrambling its input (which is the same as the input to RX.)
3. CSC RX2 O/P: the bottommost FFT display in FIGS. 7-9B depicts the spectrum of the signal as output by the first CSC receiver (RX2) after descrambling its input (which is also the same as the input to RX.)

In some of the screenshots, PLE TX (physical layer encryption transmit) is used as a label instead of CSC TX. PLE was an original name used for the present subject matter but has been changed in favor of CSC, described above. TX1 scrambles and transmits a signal consisting of a tone with two frequencies (7.85 KHz and 12.85 KHz) to differentiate it from TX2, which scrambles and transmits a signal of only a single frequency tone (7.85 KHz). However, one of the frequencies used by TX1 is exactly the same as the frequency used by TX2 (7.85 KHz). Furthermore, all frequency components are generated before scrambling with the same amplitude. This is to test for multiplexing of multiple signals of the same frequency without interference.

Both transmitters use a preamble tone at 3.5 KHz to notify the receivers, which only begin looking for scrambled signals when a tone at 3.5 KHz is detected. In this proof of concept, both transmitter/receiver pairs (TX1/RX2 and TX2/RX2) are using the same frequency for the pre-amble tone, but this does not have to be the case.

Figure 4:
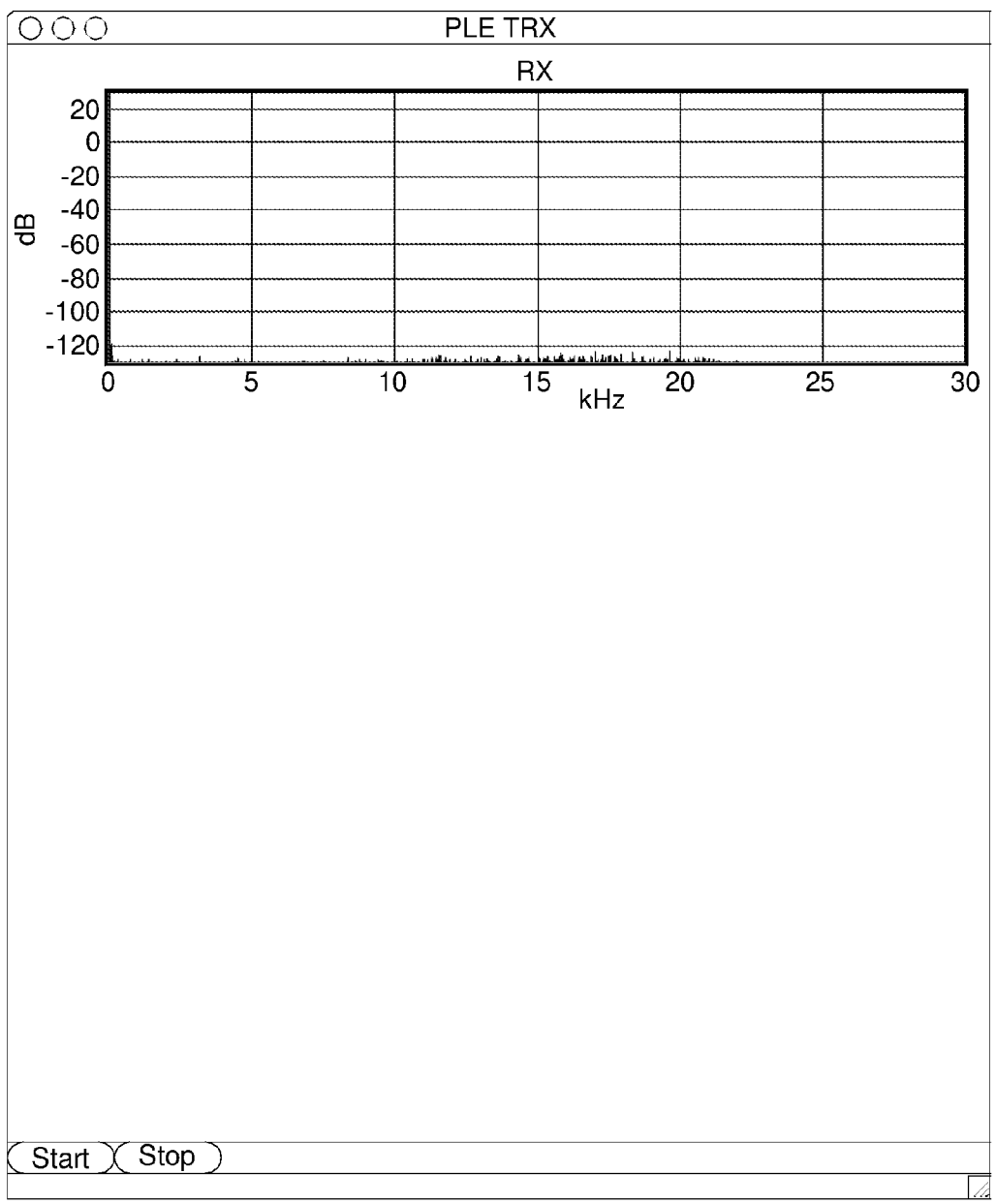
FIG. 4 is a computer screen shot illustrating the frequency representation of a detected noise at the receiver in an initial state of a system (before the transmission begins) according to an embodiment of the subject matter described herein; the detected signal consists of noise at this point as no signal transmission occurred yet.

FIG. 4 is a screen shot of background noise. The background noise illustrated in FIG. 4 is probably due to spurious signals picked up by the soundcard ADC, which may come from ambient noise, hardware imperfections or the audio cable, which acts as an antenna. This noise has very low strength (<−120 dB) and hence is not apparent in the FIGS. 5-9B, which only go down to −110 dB so that the received signals are scaled better.

Figure 5:
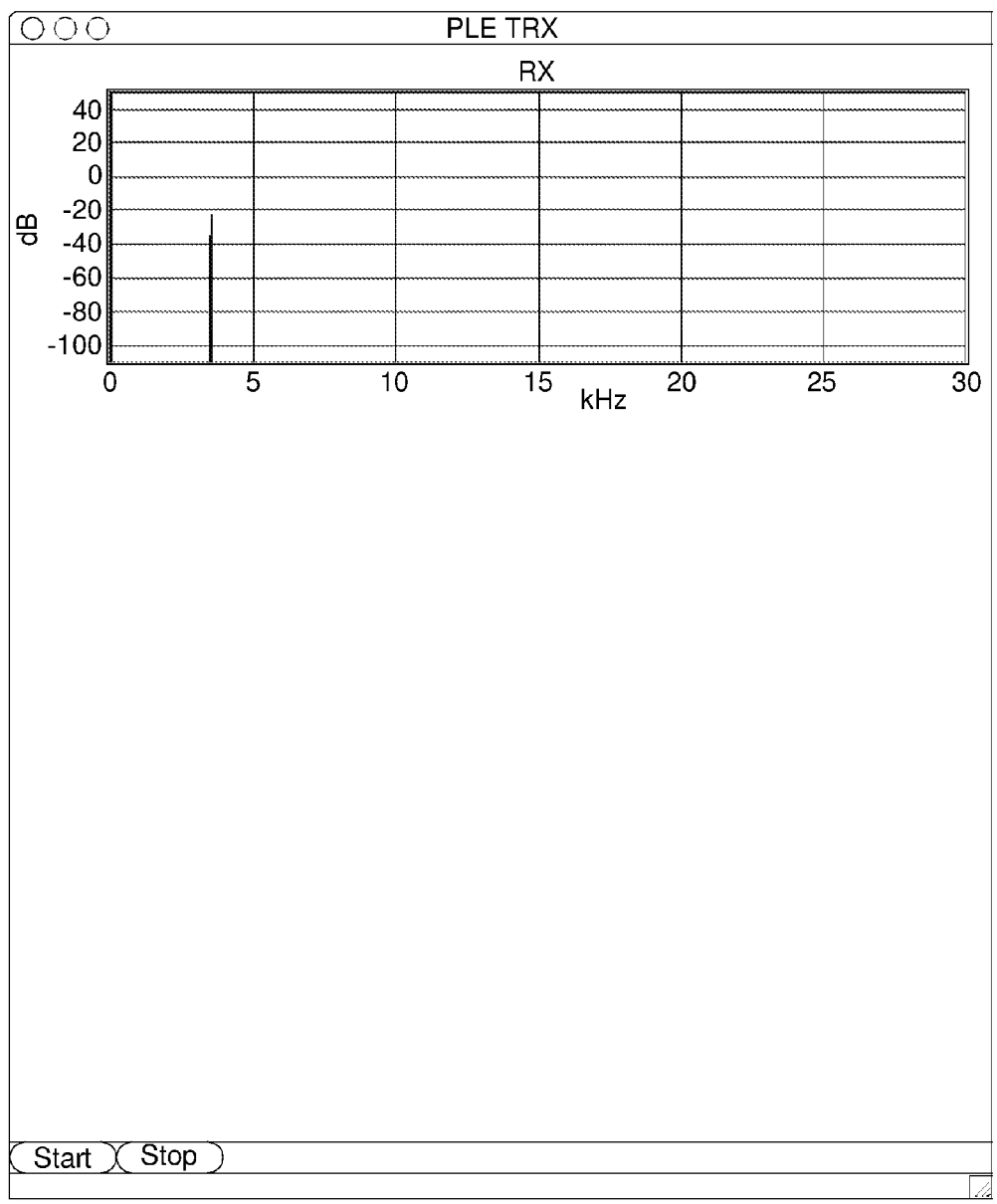
FIG. 5 is a computer screen shot illustrating the frequency representation of the reception of a synchronization tone according to an embodiment of the subject matter described herein.

FIG. 5 illustrates detection of the synchronization preamble at the receiver. The preamble tone at 3.5 KHz is clearly seen in the RX display (RX1 and RX2 display are empty and are not shown in FIG. 5 because they haven't synchronized yet.)

Figure 6:
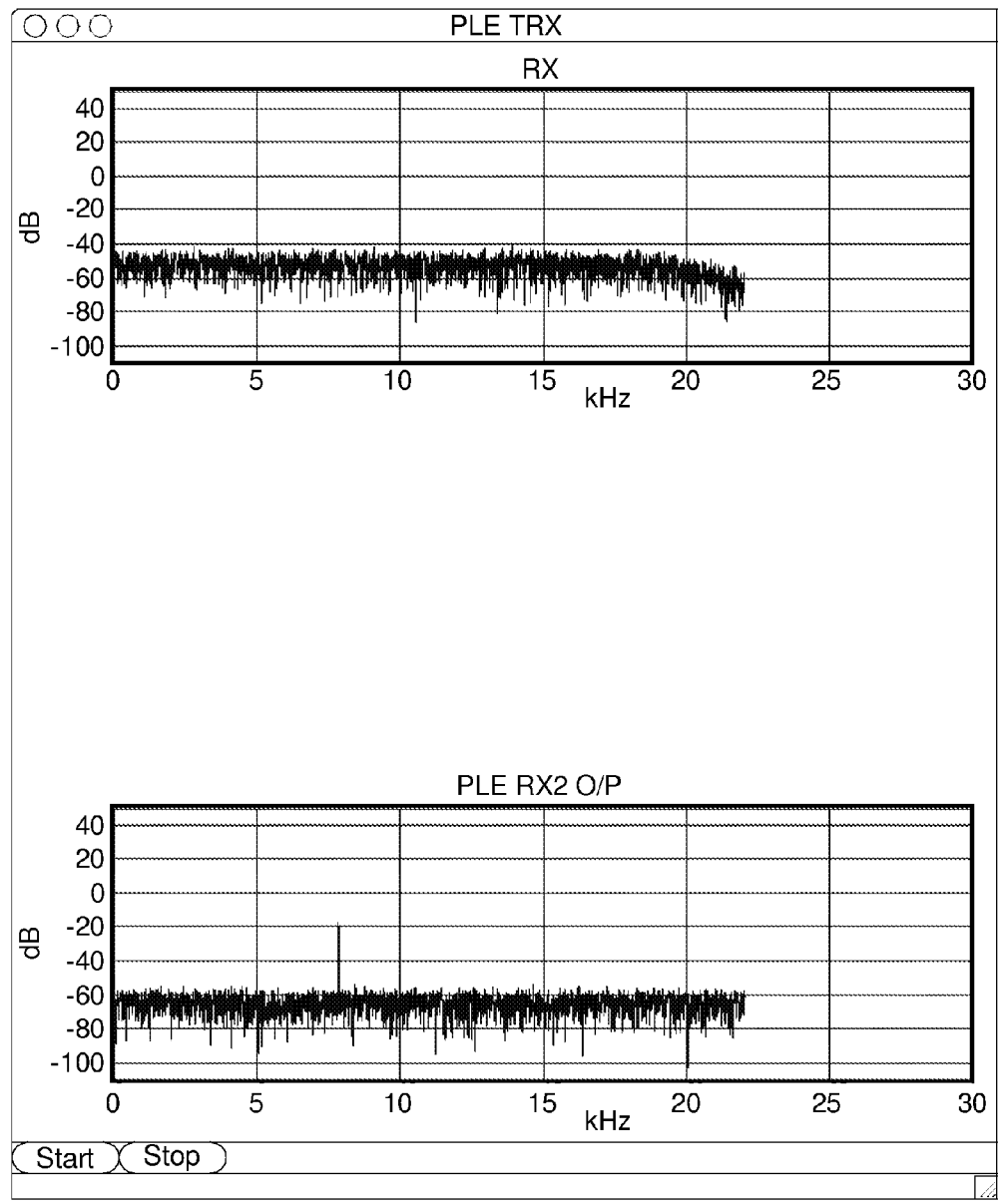
FIG. 6 includes computer screen shots illustrating the frequency representation of the received scrambled signal (in the top screen) and the detected signals after synchronization (in the bottom screen) according to embodiment of the subject matter described herein.

FIG. 6 illustrates synchronization of the receiver RX2 with the transmitter TX2. In FIG. 6, the descrambled signal is clearly seen as a spike in the RX2 display at 7.85 KHz. The RX1 window is empty, as it could not synchronize with TX2 signal because of differing keys. Note that the noise level in the RX2 display is around −60 dB while the signal is at −20 dB. The noise level in the RX display is about −40 dB, which falls neatly around the average of the noise (−60 dB) and signal (−20 dB) in RX2.

Figure 7:
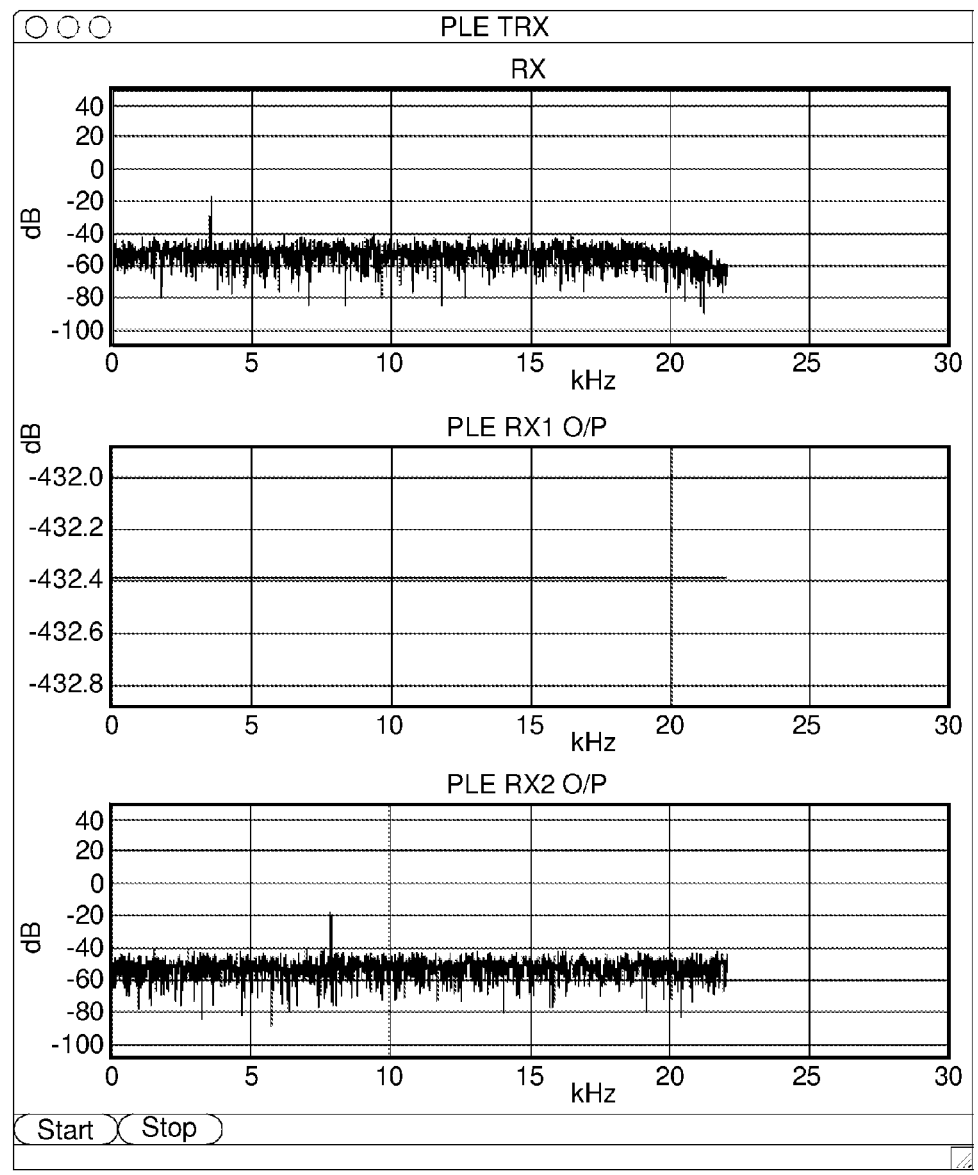
FIG. 7 includes computer screen shots illustrating in the first screen the frequency representation of the received signal comprising the scrambled signal for user 2 and the synchronization preamble for user 1, in the second screen the frequency representation of signal detected by user 1 (empty as user 1 only synchronizes at this stage) and in the third screen the frequency representation of the descrambled signal from user 2 (clearly showing the transmitted tone) according to an embodiment of the subject matter described herein.

FIG. 7 illustrates screen shots for receivers RX, RX1, and RX2. In FIG. 7, the preamble tone is seen as a spike, again at 3.5 KHz, over the noise (which is actually the scrambled TX2 signals in the background) in the RX display. Note that the signal descrambled by RX2 is still visible as the −20 dB spike at 7.85 KHz in the third FFT display, but the noise level has increased to −40 dB. The preamble signal (seen in the RX display) is not visible in the RX2 display because RX2 has descrambled it into noise, which explains the increase in the noise level in the RX2 output.

Figure 8:
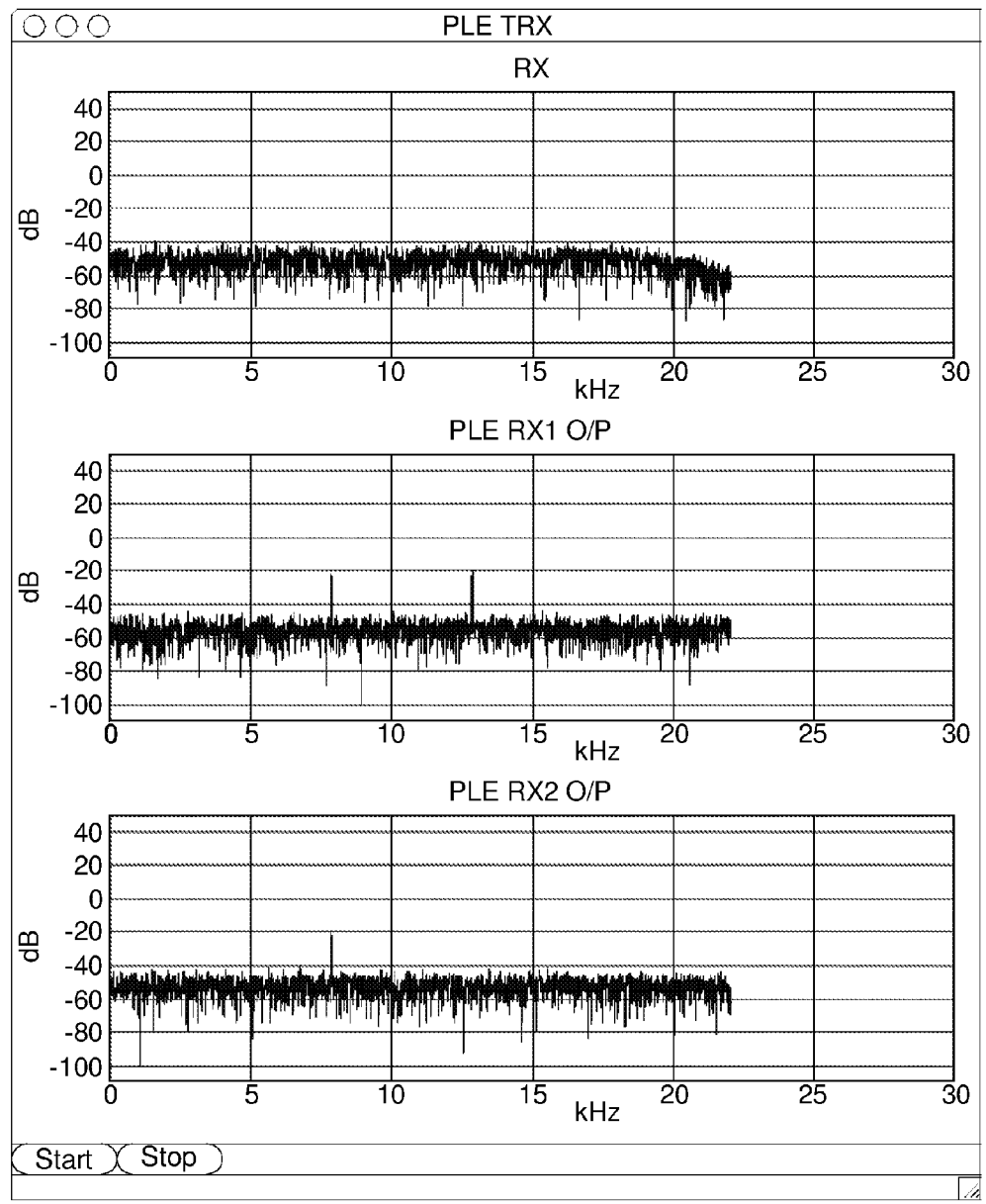
FIG. 8 includes computer screen shots illustrating in the first screen the frequency representation of the received signal at the receivers of the two users, in the second screen the frequency representation of the signal descrambled by user 1 and in the third screen the frequency representation of the signal descrambled by user 2 according to an embodiment of the subject matter described herein.

FIG. 8 illustrates screen shots for RX, RX1, and RX2 where RX1 synchronizes with TX1. In FIG. 8, the descrambled signal is clearly seen as two spikes in the RX1 display at 7.85 KHz and 12.85 KHz. Note that the noise level at both, RX1 and RX2 is around −40 dB while all the signals are at −20 dB. A quick calculation gives us an SNR of 20. This implies that the presence of simultaneous CSC transmissions, other signals or even ambient noise does not greatly increase the level of descrambling noise at the receiver output.

Figure 9A:
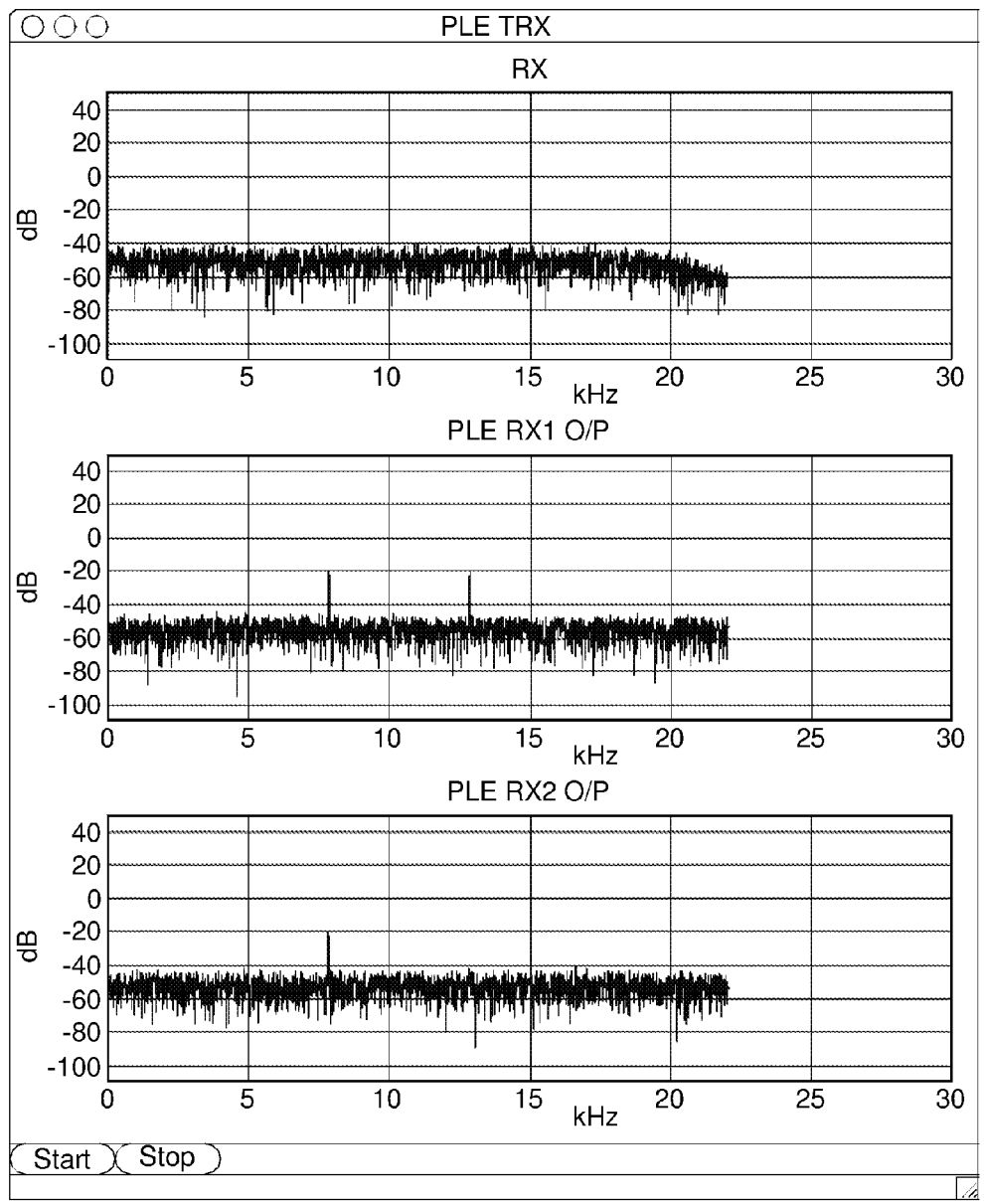
FIGS. 9A and 9B include computer screen shots illustrating the frequency representation of descrambling of samples by two receivers for the same shared medium according to an embodiment of the subject matter described herein.
Figure 9B:
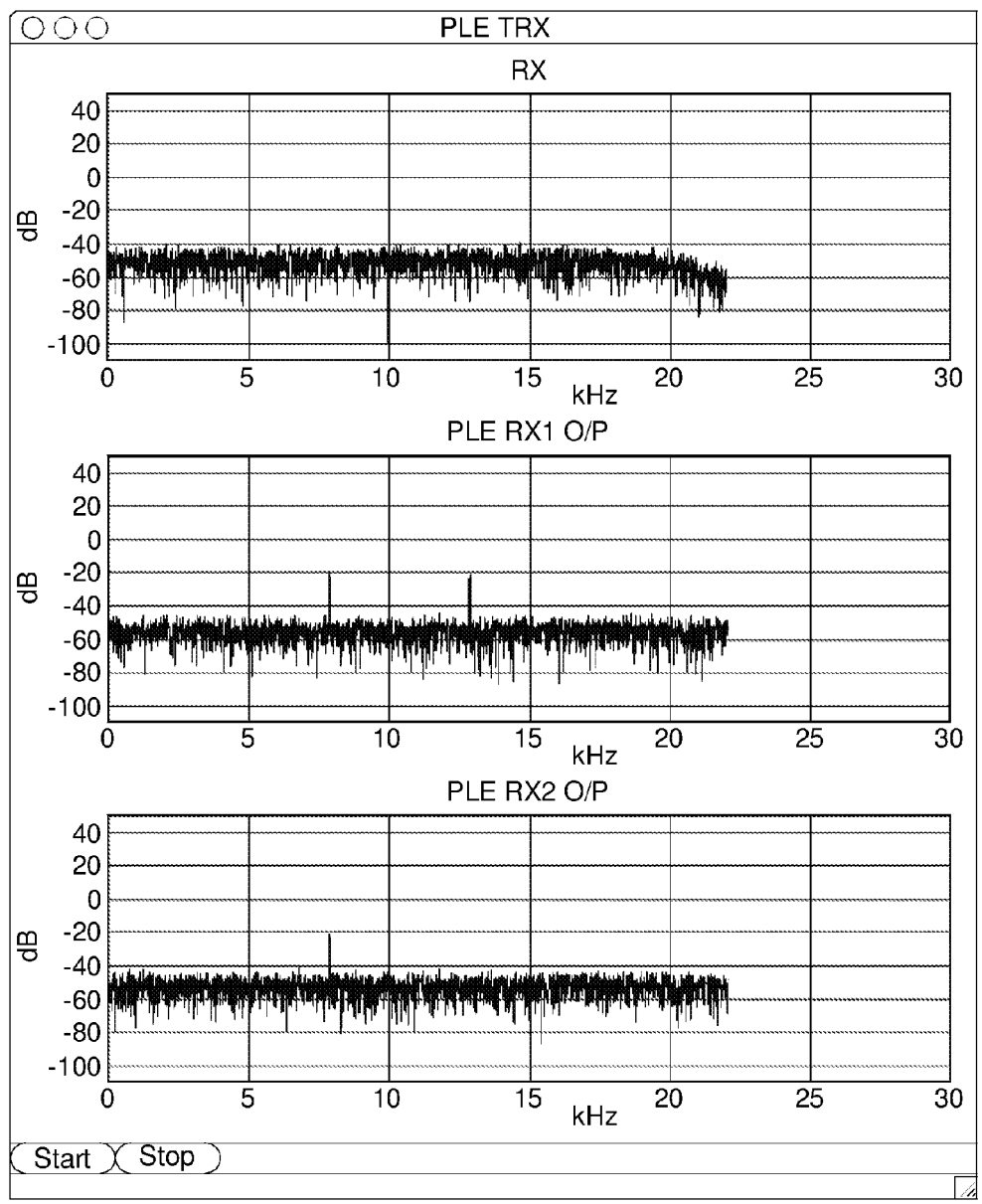

FIGS. 9A and 9B illustrate additional screens where samples from the same shared medium are descrambled into two different non-interfering signals after synchronization. Note that the RX FFT display always contains an almost flat spectrum when any transmitter is transmitting. This demonstrates signal encryption and obfuscation.

Also observe that the descrambled signals contain a component at the same frequency (7.85 KHz), but they do not interfere. The signal strength of the first frequency component output would be different from the second frequency component at RX1 if they interfered, that is, it would be greater due to constructive interference or it would be lesser due to destructive interference. After descrambling at both receivers, the signal strengths are at −20 dB, while the average noise power is −40 dB. Note that this stays almost constant before and after the second transmitter starts transmitting. However, as they were transmitted, both frequency components at the receivers have the exact same strength. Moreover, the signal strength at RX2 does not change after TX1 starts transmitting, only the noise level does. This indicates that there is no interference, thus demonstrating multiplexing.

Significantly, also note that the RX spectrum, in fact, should be flat throughout the range of frequencies, which is what is actually transmitted. But as seen in FIGS. 4-9B, the otherwise-flat RX spectrum attenuates towards the higher frequencies. This is most likely the effect of signal processing components in the soundcard transmitter or receiver or both. Such distortions would be common, and in fact omnipresent, when the signal is traveling through the medium in, both, wired and wireless, communications. However, the fact that the original signals are being recovered at the receiver also demonstrates the robustness of CSC when faced with distortions and ambient noise in the received signal.

CSC Wireless Proof of Concept

This experiment demonstrates the results of one transmitter and one receiver communicating simultaneously over the same, shared medium over. The shared medium is the surrounding air conducting the signals as sound between the speakers of a soundcard to a microphone connected to the input port of a soundcard, which in this case, was the same soundcard. The transmitter comprises GnuRadio software sending samples to the first soundcard DAC and the receiver comprises GnuRadio software receiving samples from the second soundcard ADC.

Figure 10:
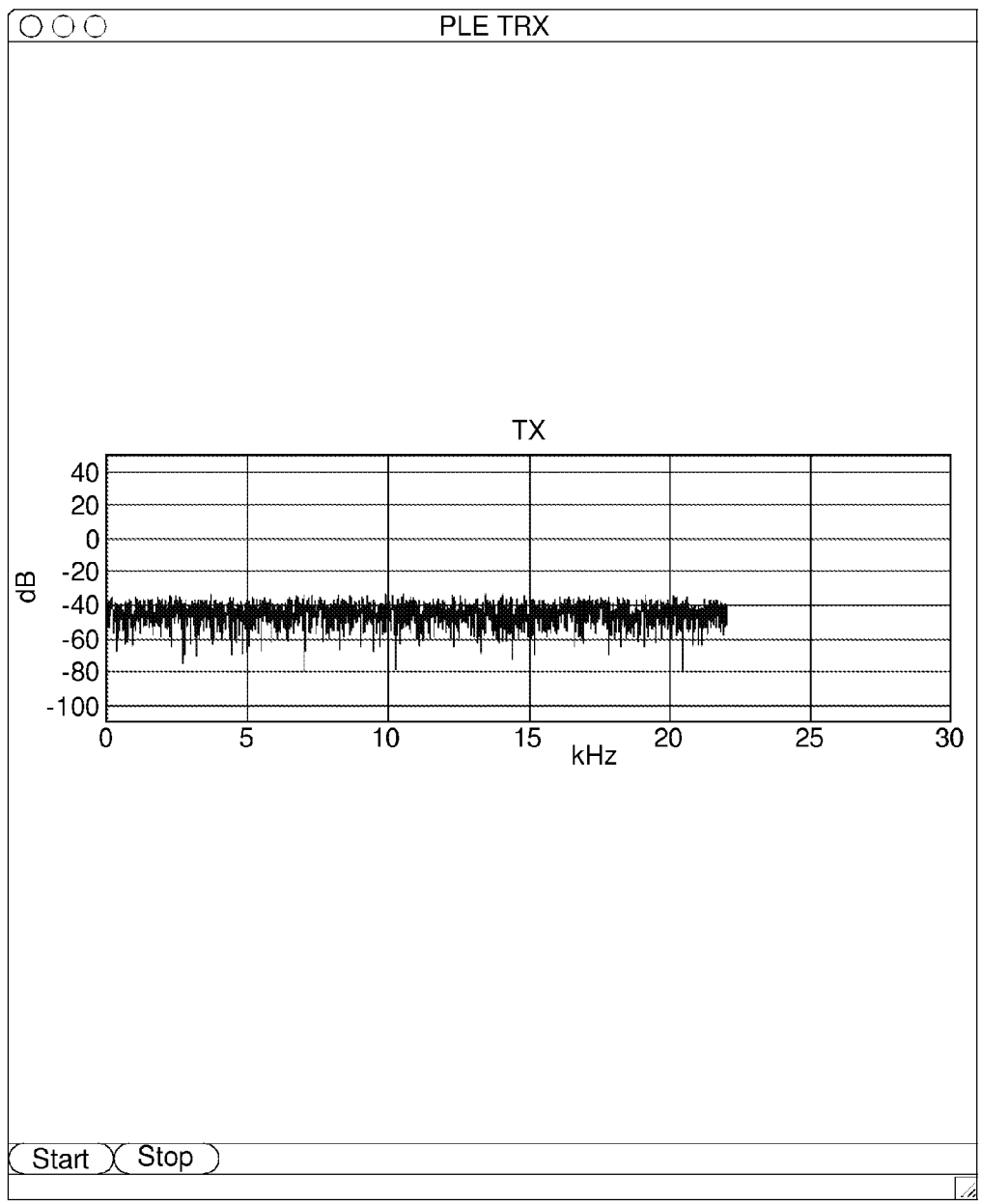
FIG. 10 is a computer screen shot illustrating a spectrum of a signal to be transmitted by a transmitter according to an embodiment of the subject matter described herein.
Figure 13:
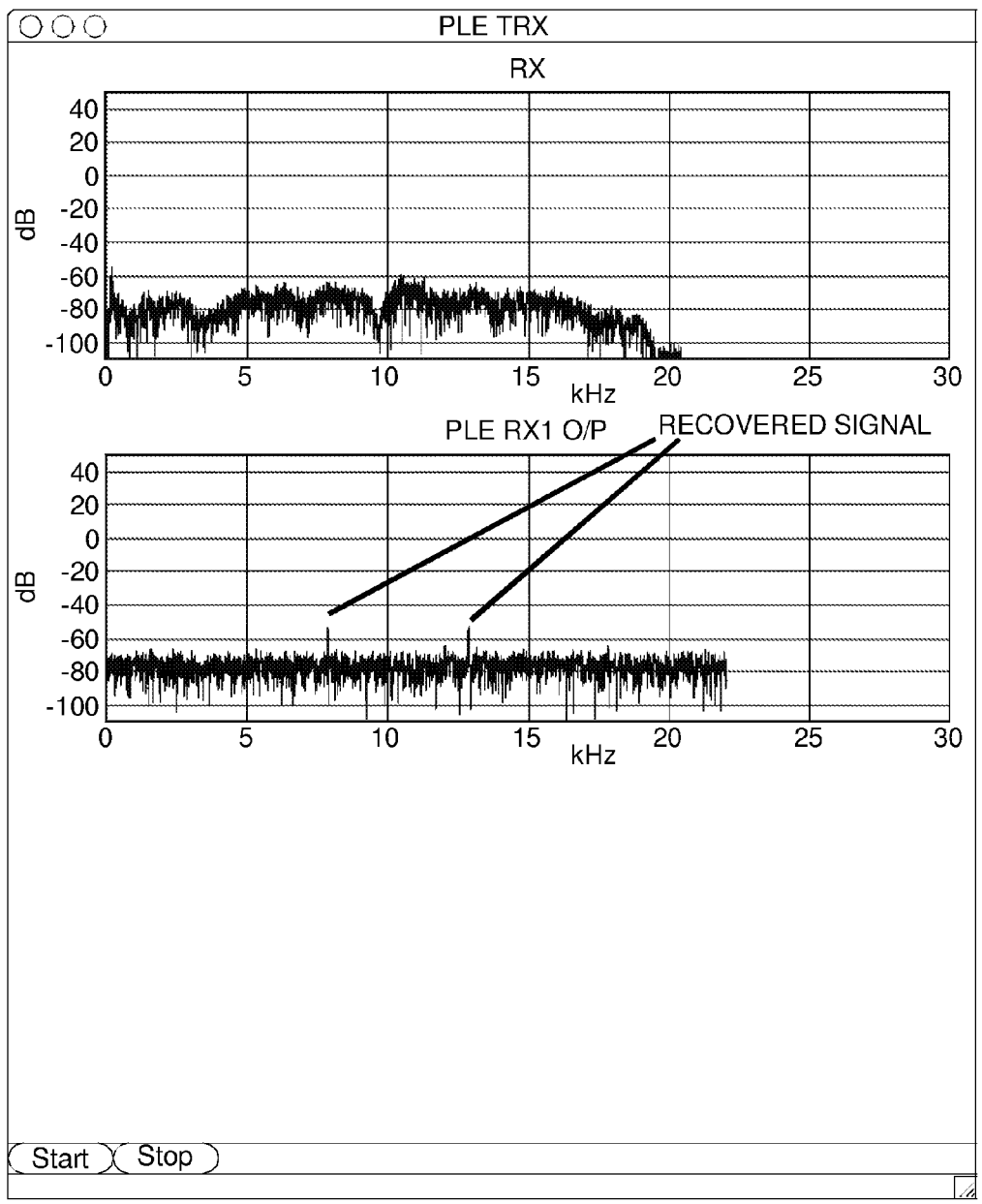
FIG. 13 includes computer screen shots illustrating in the first screen the frequency representation of the (distorted) received signal, and in the second screen the frequency representation of a recovered (descrambled) signal after receiver 1 synchronizes with the transmitter according to an embodiment of the subject matter described herein.

Significantly, note that the RX spectrum should be flat throughout the range of frequencies, which is what is actually transmitted (see FIG. 10). But as seen in FIG. 13, the RX spectrum is not flat at all. This is probably the effect of signal processing components in the soundcard transmitter or receiver or both, or effect of ambient noise in the air, but more importantly, because of the limited frequency response of the mechanical components (voice coils) of the speakers and microphone, rather than the air itself.

Figure 11:
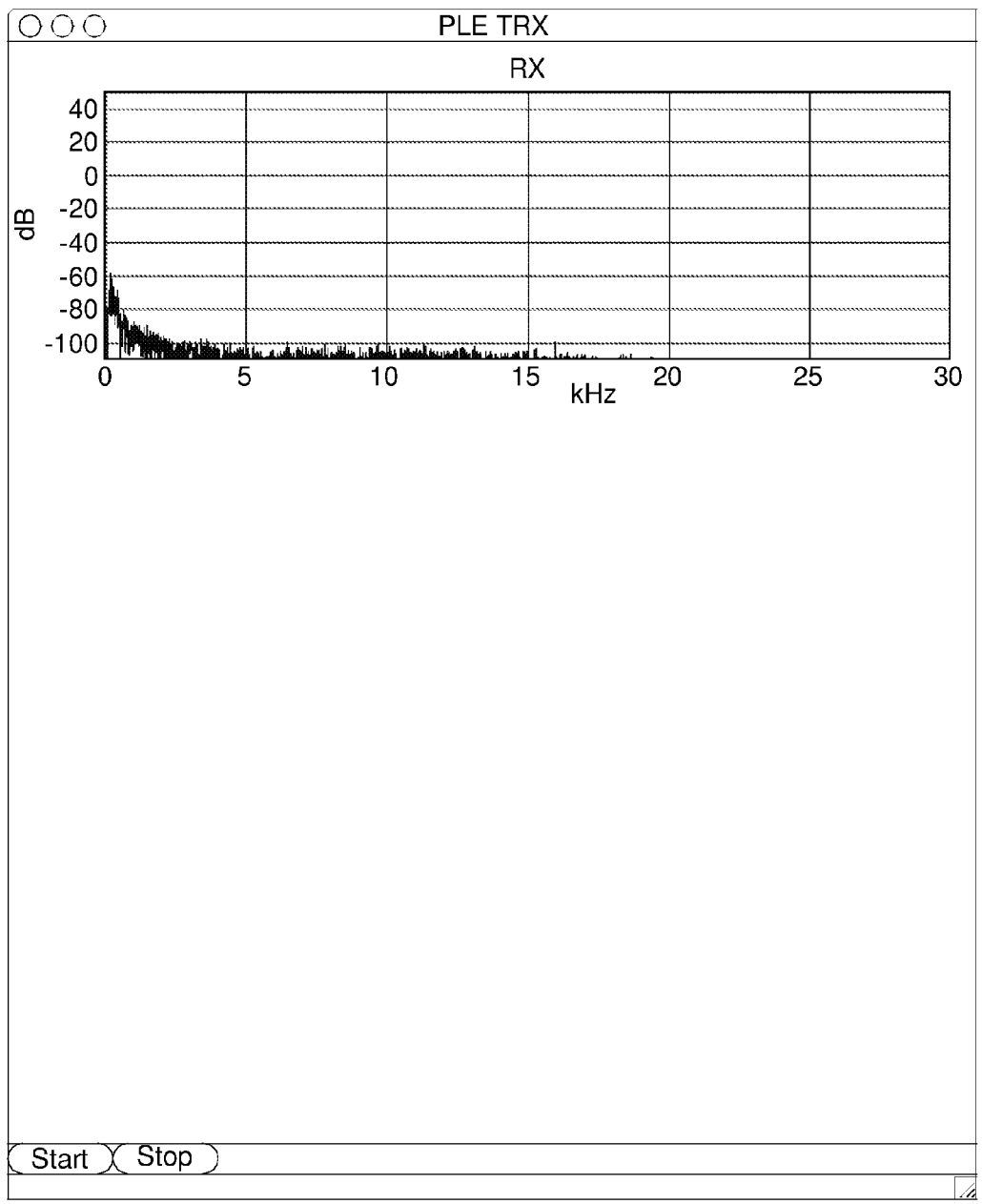
FIG. 11 is a computer screen shot illustrating the frequency representation of an initial state of a communication system where background noise (before anything is transmitted) is received according to an embodiment of the subject matter described herein.

The background noise illustrated in FIG. 11 is because of the ambient acoustic noise, including the hum of the Air Conditioning and a white-noise system.

As in the previous experiment, TX1 scrambles and transmits a signal consisting of a tone with two frequencies (7.85 KHz and 12.85 KHz). It also uses a preamble tone at 3.5 KHz to notify the receiver, which only begin looking for scrambled signals when a tone at 3.5 KHz is detected.

Figure 12:
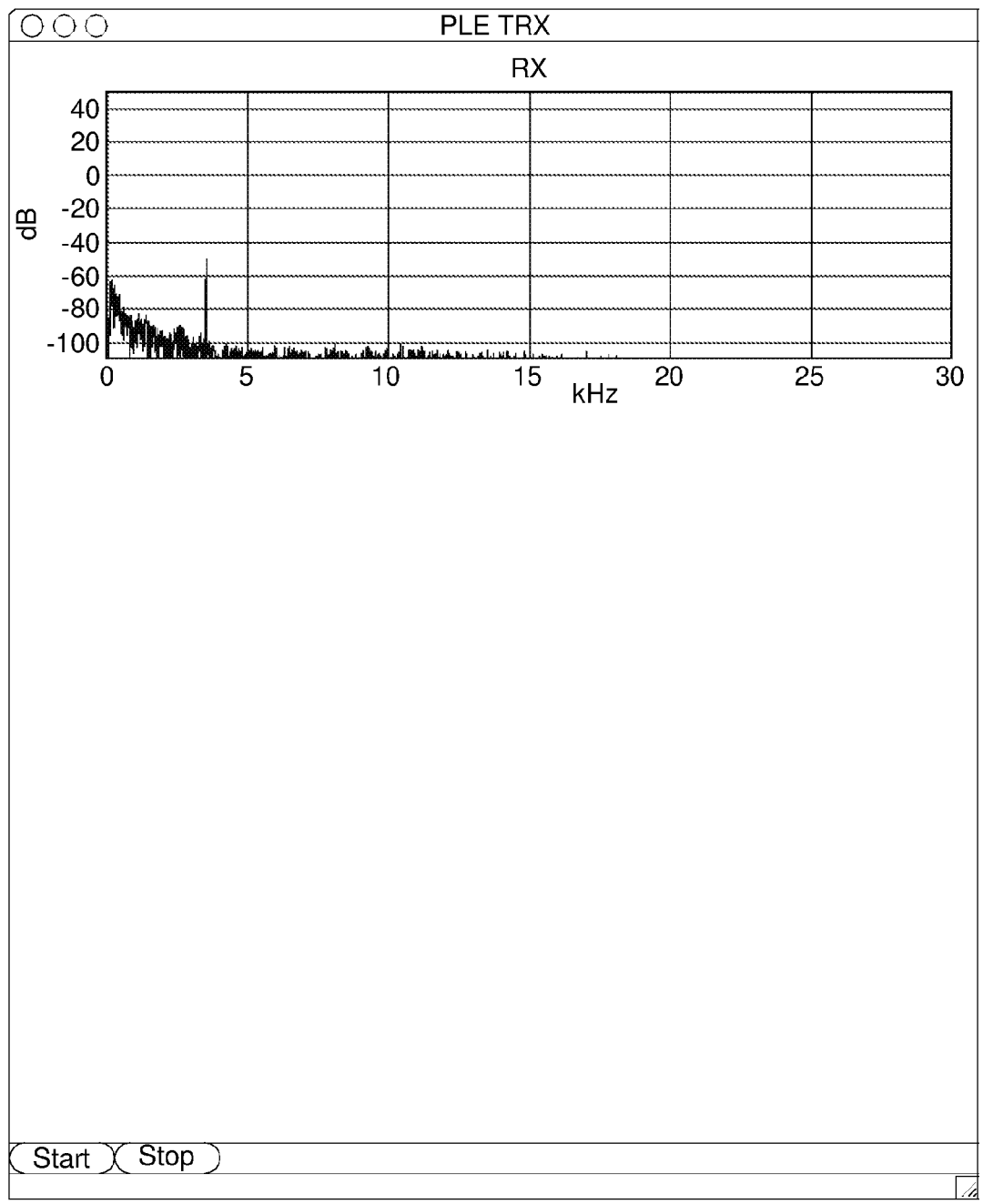
FIG. 12 is computer screen shot illustrating the frequency representation of a received signal after the transmitter starts transmitting the synchronizing preamble according to an embodiment of the subject matter described herein.

FIG. 12 is a screen shot illustrating reception of a synchronization tone that was transmitted by transmitter TX1. In FIG. 12, the preamble tone at 3.5 KHz is clearly seen in the RX display over the background noise (RX1 display is empty because they haven't synchronized yet.)

In this experiment, RX1 synchronizes with TX1, despite the heavy distortion in the transmitted signal. A screen shot illustrating results of this experiment is illustrated in FIG. 13.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A computer-implemented method of synchronizing a transmitter and a receiver comprising:

a. at a transmitter:
   i. generating a first sequence of samples using a predetermined method, and
   ii. transmitting the generated first sequence of samples to or over a medium;
b. at a receiver:
   i. generating a second sequence of samples using the predetermined method;
   ii. receiving a received sequence of samples from the medium; and
   iii. detecting the presence of the generated second sequence of samples in the received sequence of samples, and if detected, determining a synchronization offset within the received sequence of samples;
   iv. synchronizing the receiver to the transmitter such that further processing of the received sequence of samples is based on the synchronization offset;
   wherein the first sequence of samples, the second sequence of samples and the received sequence of samples represent analog signals, and wherein the predetermined method comprises generating a scrambled sequence of samples representing an analog signal that resembles white noise by reordering a sequence of samples representing a known signal.

2. The method of claim 1 where the predetermined method of generating the scrambled sequence of samples comprises:
   a. generating an unscrambled sequence of samples representing the known signal;
   b. and reordering the unscrambled sequence of samples.

3. The method of claim 2 where reordering the unscrambled sequence of samples representing a known signal comprises reordering the unscrambled sequence of samples based on a scrambling sequence.

4. The method of claim 3 where the scrambling sequence is generated using a pseudorandom number generator.

5. The method of claim 1 wherein synchronizing the transmitter and receiver comprises using a different predetermined method for each transmitter-receiver pair of a plurality of transmitter-receiver pairs, and wherein each transmitter transmits the first sequence of samples generated by the corresponding different predetermined method over the medium simultaneously in the same frequency band.

6. The method of claim 5 wherein using a different predetermined method for each transmitter-receiver pair comprises generating an unscrambled sequence of samples representing a known signal and scrambling the unscrambled sequence using a different scrambling sequence for each transmitter-receiver pair.

7. The method of claim 1 where transmitting the generated sequence of samples to or over the medium comprises converting the generated sequence of samples into an analog signal, up converting the analog signal to a desired frequency band, and transmitting the up-converted signal to or over the medium.

8. The method of claim 1 wherein, at the receiver, detecting the presence of the generated second sequence of samples in the received sequence of samples, and if detected, determining the synchronization offset within the received sequence of samples comprises:
   a. cross-correlating the generated second sequence of samples with the received sequence of samples;
   b. finding an offset in the received sequence of samples where the generated second sequence of samples has a maximum correlation with the received sequence of samples; and
   c. if the maximum correlation exceeds a threshold, detecting the presence of the generated second sequence of samples in the received sequence of samples and determining the synchronization offset based on the offset of maximum correlation.

9. The method of claim 1 further comprising, at the transmitter, after transmitting the generated sequence of samples to or over the medium, transmitting a sequence of scrambled data modulated signal samples, the scrambled data modulated signal samples being generated by:
   a. receiving digital or analog data to be transmitted;
   b. generating data modulated signal samples by performing modulation using the received digital or analog data;
   c. scrambling the data modulated signal samples to generate scrambled data modulated signal samples, wherein the scrambling comprises reordering the data modulated signal samples using a scrambling sequence.

10. The method of claim 9 further comprising, at the receiver, after determining the synchronization offset of the generated second sequence of samples within the received sequence of samples, producing analog or digital data using the received sequence of samples by:
    a. descrambling the received sequence of samples starting at the synchronization offset to produce descrambled received samples, wherein the descrambling comprises reordering the data modulated signal samples using a descrambling sequence that is the inverse of the scrambling sequence used at the transmitter;
    b. performing demodulation using the descrambled received samples to produce digital or analog data, wherein the demodulation is the inverse of the modulation used at the transmitter.

11. A system for synchronizing a transmitter and a receiver comprising:
    a. a transmitter comprising a first processor communicatively coupled to a transmitting transducer, where the first processor is configured to:
       i. generate a first sequence of samples using a predetermined method; and
       ii. transmit the generated first sequence of samples to or over a medium via the transmitting transducer;
    b. a receiver comprising a second processor communicatively coupled to a receiving transducer, where the second processor is configured to:
       i. generate a second sequence of samples using the predetermined method;
       ii. receive, via the receiving transducer, a received sequence of samples from the medium; and
       iii. detect the presence of the generated second sequence of samples in the received sequence of samples, and if detected, to determine a synchronization offset within the received sequence of samples;
       iv. synchronize the receiver to the transmitter such that further processing of the received sequence of samples is based on the synchronization offset;
    wherein the first sequence of samples, the second sequence of samples and the received sequence of samples represent analog signals, and wherein the predetermined method comprises generating a scrambled sequence of samples representing an analog signal that resembles white noise by reordering a sequence of samples representing a known signal.

12. The system of claim 11 where the predetermined method of generating the scrambled sequence of samples comprises:

a. generating an unscrambled sequence of samples representing the known signal;
b. and reordering the unscrambled sequence of samples.

13. The system of claim 12 where reordering the unscrambled sequence of samples representing a known signal comprises reordering the unscrambled sequence of samples based on a scrambling sequence.

14. The system of claim 13 where the scrambling sequence is generated using a pseudorandom number generator.

15. The system of claim 11 wherein synchronizing the transmitter and receiver comprises the first processor of the transmitter and the second processor of the receiver being configured to use a different predetermined method for each transmitter-receiver pair of a plurality of transmitter-receiver pairs, and wherein each transmitter transmits the generated first sequence of samples over the medium simultaneously in the same frequency band.

16. The system of claim 15 wherein using a different predetermined method for each transmitter-receiver pair comprises generating an unscrambled sequence of samples representing a known signal and scrambling the unscrambled sequence using a different scrambling sequence for each transmitter-receiver pair.

17. The system of claim 11 wherein the configuration of the second processor at the receiver to detect the presence of the generated second sequence of samples in the received sequence of samples, and if detected, determine the synchronization offset within the received sequence of samples comprises the steps of:
   a. cross-correlating the generated second sequence of samples with the received sequence of samples;
   b. finding an offset in the received sequence of samples where the generated second sequence of samples has a maximum correlation with the received sequence of samples; and
   c. if the maximum correlation exceeds a threshold, detecting the presence of the generated second sequence of samples in the received sequence of samples and determining the synchronization offset based on the offset of maximum correlation.

18. The system of claim 11 where the first processor at the transmitter is further configured to, after transmitting the generated sequence of samples to or over the medium via the transmitting transducer, transmit a sequence of scrambled data modulated signal samples, the scrambled data modulated signal samples being generated by:
   a. receiving digital or analog data to be transmitted;
   b. generating data modulated signal samples by performing modulation using the received digital or analog data;
   c. scrambling the data modulated signal samples scrambled data modulated signal samples, wherein the scrambling comprises reordering the data modulated signal samples using a scrambling sequence.

19. The system of claim 18 where the second processor at the receiver is further configured to, after determining the synchronization offset of the generated second sequence of samples within the received sequence of samples, produce analog or digital data using the received sequence of samples, the analog or digital data being produced by:
   a. descrambling the received sequence of samples starting at the synchronization offset to produce descrambled received samples, wherein the descrambling comprises reordering the data modulated signal samples using a descrambling sequence that is the inverse of the scrambling sequence used at the transmitter;
   b. performing demodulation using the descrambled received samples to produce digital or analog data, wherein the demodulation is the inverse of the modulation used at the transmitter.

20. A non-transitory computer readable medium having stored thereon computer executable instructions that when executed by a processor of a computer perform to operate as a receiver, the steps comprising:
   a. generating a reference sequence of samples using a predetermined method;
   b. receiving, from a medium via a receiving transducer, a received sequence of samples containing a synchronizing sequence of samples generated using the predetermined method by a transmitter; and
   c. detecting whether the received sequence of samples contains the generated reference sequence of samples, and if detected, determining a synchronization offset within the received sequence of samples;
   d. synchronizing the receiver to the transmitter by further processing the received sequence of samples based on the synchronization offset;
   wherein the reference sequence of samples, the received sequence of samples and the synchronizing sequence of samples represent analog signals, and wherein the predetermined method comprises generating a scrambled sequence of samples representing an analog signal that resembles white noise by reordering a sequence of samples representing a known signal.

* * * * *